United States Patent
Sharma et al.

(10) Patent No.: US 11,693,918 B2
(45) Date of Patent: Jul. 4, 2023

(54) METHODS AND SYSTEMS FOR REDUCING VOLUMES OF LOG MESSAGES SENT TO A DATA CENTER

(71) Applicant: VMware, Inc., Palo Alto, CA (US)

(72) Inventors: Anil Sharma, Palo Alto, CA (US);
Darren Brown, Seattle, WA (US);
Ashok Kumar, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 33 days.

(21) Appl. No.: 17/382,676

(22) Filed: Jul. 22, 2021

(65) Prior Publication Data

US 2021/0382746 A1 Dec. 9, 2021

Related U.S. Application Data

(63) Continuation-in-part of application No. 16/893,778, filed on Jun. 5, 2020, now Pat. No. 11,281,520.

(51) Int. Cl.
| | |
|---|---|
| *G06F 11/00* | (2006.01) |
| *G06F 17/40* | (2006.01) |
| *G06F 9/455* | (2018.01) |
| *G06F 11/34* | (2006.01) |
| *G06F 11/07* | (2006.01) |
| *G06F 11/30* | (2006.01) |
| *G06F 18/22* | (2023.01) |
| *G06F 18/23213* | (2023.01) |

(52) U.S. Cl.
CPC .......... *G06F 17/40* (2013.01); *G06F 9/45558* (2013.01); *G06F 11/0787* (2013.01); *G06F 11/3006* (2013.01); *G06F 11/3476* (2013.01); *G06F 18/22* (2023.01); *G06F 18/23213* (2023.01); *G06F 2009/4557* (2013.01); *G06F 2009/45595* (2013.01)

(58) Field of Classification Search
CPC ............... G06F 11/079; G06F 11/0787; G06F 11/3006; G06F 11/3409; G06F 11/3476; G06F 11/0793; G06F 11/3452
See application file for complete search history.

(56) References Cited

U.S. PATENT DOCUMENTS

| | | | | |
|---|---|---|---|---|
| 2017/0078169 A1* | 3/2017 | Bent | .................... | H04L 43/0876 |
| 2019/0370347 A1* | 12/2019 | Levy | ....................... | G06K 9/622 |
| 2019/0386819 A1* | 12/2019 | Ertl | ....................... | H04L 9/3247 |

\* cited by examiner

*Primary Examiner* — Charles Ehne

(57) ABSTRACT

Computer-implemented methods and systems described herein are directed to reducing volumes of log messages sent from edge systems to a data center. The computer-implemented methods performed at each edge system includes collecting a stream of log messages generated by one or more event sources of the edge system. Representative log messages of the stream of log messages are determined. The edge systems may discard non-representative log messages from data storage devices at the edge system. The representative log messages are sent from each of the edge systems to the data center where the representative log messages are received and stored in data storage devices of the data center, thereby reducing the volumes of log messages sent from the edge systems to the data center.

19 Claims, 32 Drawing Sheets log.write([$Time_date] [Thread-$X/$IP/INFO] [com.vmware.loginsight.commons.executor.ProcessExecutor] [[/usr/lib/loginsight/application/lib/apache-cassandra-2.0.10/bin/nodetool, -h, montools-prod-loginsight.vmware.com, repair]] [$Time_date] Repair session $RS for range $range finished)

FIG. 15

[2019-03-10 23:43:36.859+0000] [Thread-1822496/127.0.0.1 INFO] [com.vmware.loginsight.commons.executor.ProcessExecutor] [[[/usr/lib/loginsight/application/lib/apache-cassandra-2.0.10/bin/nodetool, -h, montools-prod-loginsight.vmware.com, repair]] [2015-03-10 23:43:36,716] Repair session 51312720-c77e-11e4-ad72-4769d614a3f2 for range (-6899937477723537626, -6896547230076663429) finished]

```
2019-12-02T10:44:24.095Z li-qe-esx5.vmware.com Rhttpproxy:
[28959B90 verbose 'Proxy Req 46691'] Connected to localhost:8307
```

```
2019-12-02T10:44:24.094Z li-qe-esx5.vmware.com Rhttpproxy:
[FFFC2B90 verbose 'Proxy Req 46691'] new proxy client TCP (local-
127.0.0.1:80, peer=127.0.0.1:50155)
```

```
2019-12-02T10:44:24.093Z li-qe-esx5.vmware.com Rhttpproxy: [2889B90
verbose 'Proxy Req 46685'] The client closed the stream, not
unexpectedly.
```

```
Dec  2 18:48:29 strata-vc 2019-12-02T18:48:30.273Z [7FA39448B700
info 'commonvpxLro' opID=1947d6f9]  [VpxLRO] - FINISH task-
internal-2163522 -- -- vim.SessionManager.logout -
```

```
2019-12-02T18:48:51.396Z strata-esx1.eng.vmware.com Vpxa: [65B5AB90
verbose 'VpxaHalCnxHostagent' opID=WFU-ed393333]
[WaitForUpdatesDone] Completed callback
```

```
2019-12-02T18:48:51.395Z strata-esx1.eng.vmware.com Vpxa:[65B5AB90
verbose 'VpxaHalCnxHostagent' opID=WFU-ed393333]
[WaitForUpdatesDone] Starting next WaitForUpdates() call to hostd
```

```
2019-12-02T18:48:51.395Z strata-esx1.eng.vmware.com Vpxa: [65B5AB90
verbose 'vpxavpxaInvtVm' opID=WFU-ed393333]
[VpxaInvtVmChangeListener] Guest DiskInfo Changed
```

```
2019-12-02T18:48:51.395Z strata-esx1.eng.vmware.com Vpxa: [65B5AB90
verbose 'vpxavpxaInvtVm' opID=WFU-ed393333]
[VpxaInvtVmChangeListener] Guest DiskInfo Changed
```

FIG. 17

Event type: $e_i$ = cpu utilization

Log messages:

$lm_1^1$ = 2019-08-16 13:42:19 cpu utilization 23%; infor
$lm_1^2$ = 2019-08-16 13:42:19 cpu utilization 38%; infor
$lm_1^3$ = 2019-08-16 13:42:19 cpu utilization 47%; warning
$lm_1^4$ = 2019-08-16 13:42:19 cpu utilization 54%; critical Word vectors:

$$cpu = \begin{bmatrix} 1 \\ 2 \\ 3 \end{bmatrix} \quad utilization = \begin{bmatrix} 2 \\ 1 \\ 2 \end{bmatrix} \quad warning = \begin{bmatrix} 0 \\ 1 \\ 0 \end{bmatrix} \quad info = \begin{bmatrix} 1 \\ 0 \\ 0 \end{bmatrix} \quad error = \begin{bmatrix} 0 \\ 0 \\ 1 \end{bmatrix}$$

2401, 2402, 2403, 2404, 2405

Log message vectors:

$$L_i^1 = \begin{bmatrix} 1.3 \\ 1 \\ 1.7 \end{bmatrix} \quad L_i^2 = \begin{bmatrix} 1.3 \\ 1 \\ 1.7 \end{bmatrix} \quad L_i^3 = \begin{bmatrix} 1 \\ 1.3 \\ 1.7 \end{bmatrix} \quad L_i^4 = \begin{bmatrix} 1 \\ 1 \\ 2 \end{bmatrix}$$

Event type vectors:

$$E_i = \begin{bmatrix} 1.15 \\ 1.08 \\ 1.78 \end{bmatrix}$$

FIG. 24

2501 warning error forwarding to http front end err read tcp read connection reset by peer

2502 warning error forwarding to http front end err dial tcp getsocketopt connection refused

2503 warning error forwarding to http front end err dial tcp lookup front end on no such host

METHODS AND SYSTEMS FOR REDUCING VOLUMES OF LOG MESSAGES SENT TO A DATA CENTER

CROSS-REFERENCE TO RELATED APPLICATION

This application is a continuation-in-part of patent application Ser. No. 16/893,778 filed Jun. 5, 2020.

TECHNICAL FIELD

Methods and systems described herein relate to cloud service providers, and in particular, to methods and systems for storing log messages with a cloud service provider.

BACKGROUND

Electronic computing has evolved from primitive, vacuum-tube-based computer systems, initially developed during the 1940s, to modern electronic computing systems in which large numbers of multi-processor computer systems, such as server computers, workstations, and other individual computing systems are networked together with large-capacity data storage devices and other electronic devices to produce geographically distributed data centers. Data centers receive, store, process, distribute, and allow access to large amounts of data. Data centers are made possible by advances in computer networking, virtualization, distributed operating systems and applications, data-storage appliances, computer hardware, and software technologies. Data centers now make up most of the computational and data storage resources used in cloud computing and cloud-based services.

Data centers are widely used by businesses, governments, and other organizations to store and process data, execute applications, and offer services over the Internet. For example, organizations are increasingly using data centers to consolidate different types of information, such as metrics and log messages, produced by computer systems and applications that are used by the organizations outside of data centers. Organizations store millions, and in some cases billions, of log messages generated by outside computer systems each day and process the log messages to determine root causes behind hardware and software performance problems with the outside computer systems and applications. The cost of storing log messages significantly increases when a burst of log messages generated at the outside computing systems occurs because of a coding error in a sub-routine or a patch applied to software executing on the outside computing systems. Moreover, processing these large volumes of log messages to determine the root cause of a performance problem can take weeks and in rare cases can take months. Long delays in detecting and correcting the root cause of a performance problem can create mistakes in processing transactions with customers or deny people access to vital services provided by an organization, which damages an organizations reputation and drives customers to competitors. As a result, organizations seek methods and systems that significantly reduce the volumes of log messages stored in data centers and reduce the time to detecting root causes of performance problems with outside computing systems.

SUMMARY

Computer-implemented methods and systems described herein are directed to reducing volumes of log messages sent from edge systems to a data center. The computer-implemented methods performed at each edge system includes collecting a stream of log messages generated by one or more event sources of the edge system. Representative log messages of the stream of log messages are determined. The representative log messages are sent from each of the edge systems to the data center. The edge systems discard non-representative log messages from data storage devices at the edge system. The representative log messages are received and stored in data storage devices of the data center, thereby reducing the volumes of log messages sent from the edge systems to the data center.

DESCRIPTION OF THE DRAWINGS

FIG. 15 shows an example source code of an event source.

FIG. 16 shows an example of a log write instruction.

FIG. 17 shows an example of a log message generated by the log write instruction in FIG. 16.

FIG. 24 shows a numerical example of computing an event type vector for a simple example event type.

DETAILED DESCRIPTION

This disclosure is directed to computer-implemented methods and systems for reducing volumes of log messages sent to a data center. In a first subsection, computer hardware, complex computational systems, and virtualization are described. Log messages and log files are described in a second subsection. Computer-implemented methods and systems for reducing volumes of log messages sent to a data center are described in a third subsection.

Computer Hardware, Complex Computational Systems, and Virtualization

The term "abstraction" as used to describe virtualization below is not intended to mean or suggest an abstract idea or concept. Computational abstractions are tangible, physical interfaces that are implemented, ultimately, using physical computer hardware, data storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces.

Figure 1:
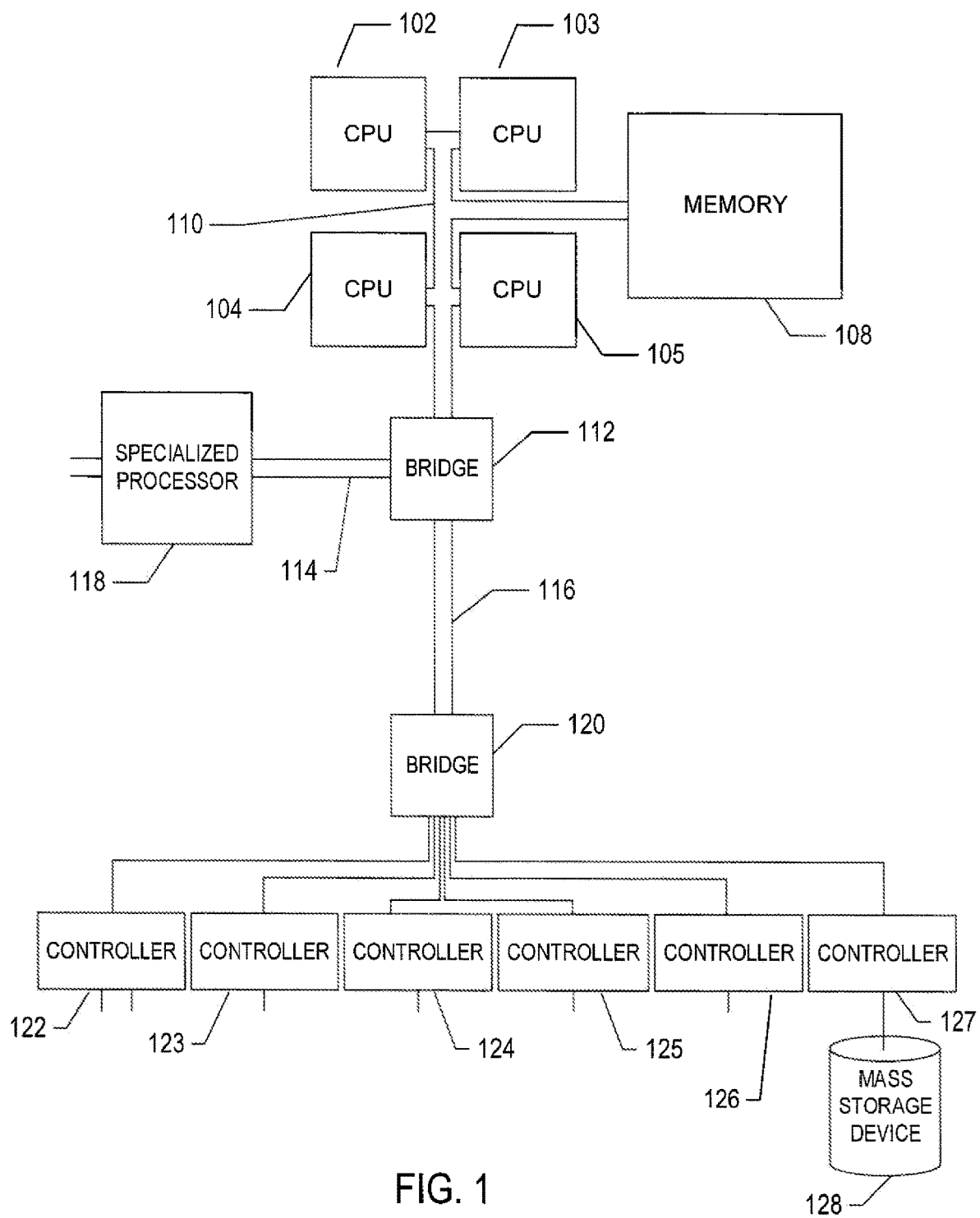
FIG. 1 shows an architectural diagram for various types of computers.

FIG. 1 shows a general architectural diagram for various types of computers. Computers that receive, process, and store log messages may be described by the general architectural diagram shown in FIG. 1, for example. The computer system contains one or multiple central processing units ("CPUs") 102-105, one or more electronic memories 108 interconnected with the CPUs by a CPU memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data storage devices include optical and electromagnetic disks, electronic memories, and other physical data storage devices.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
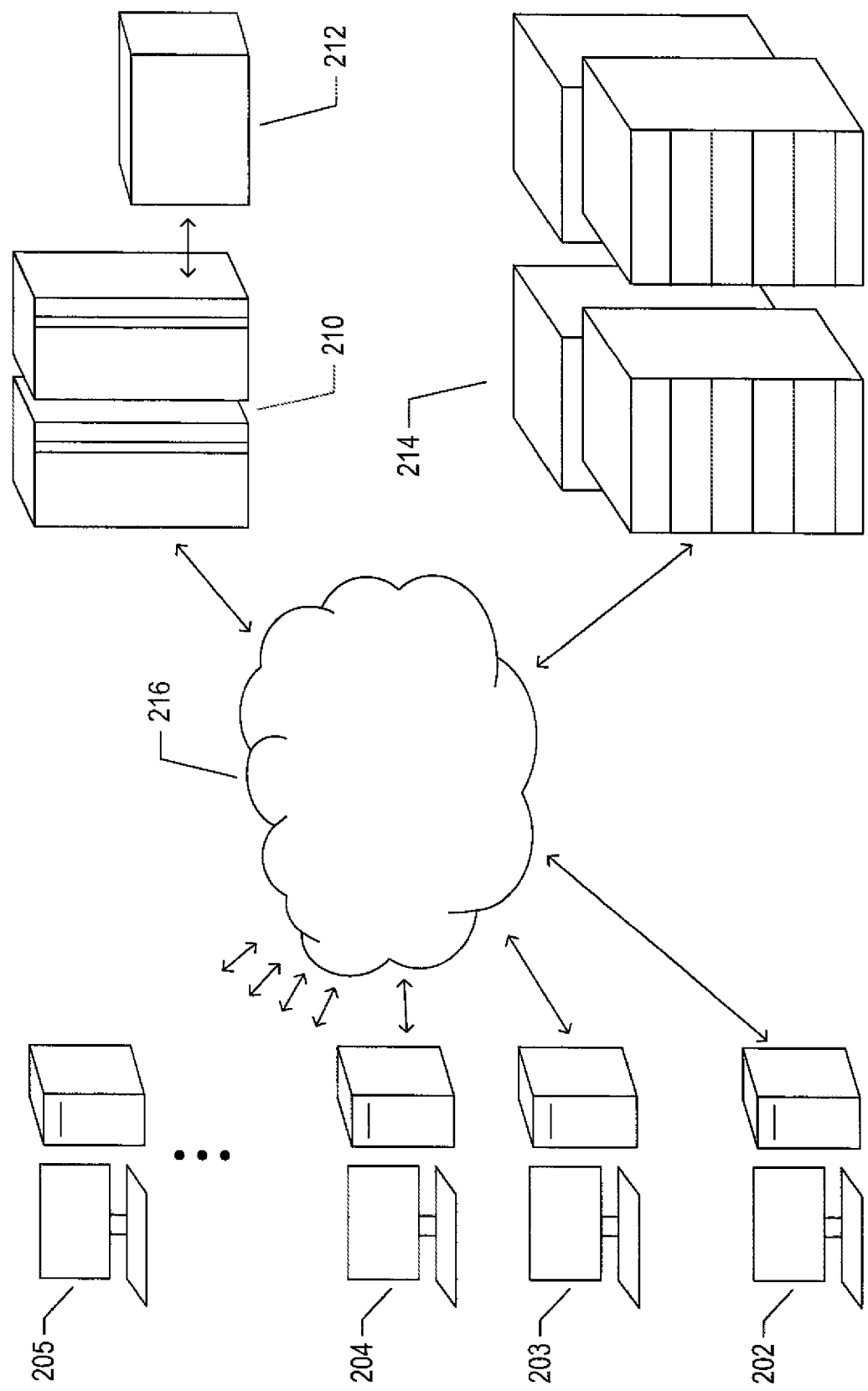
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer stems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
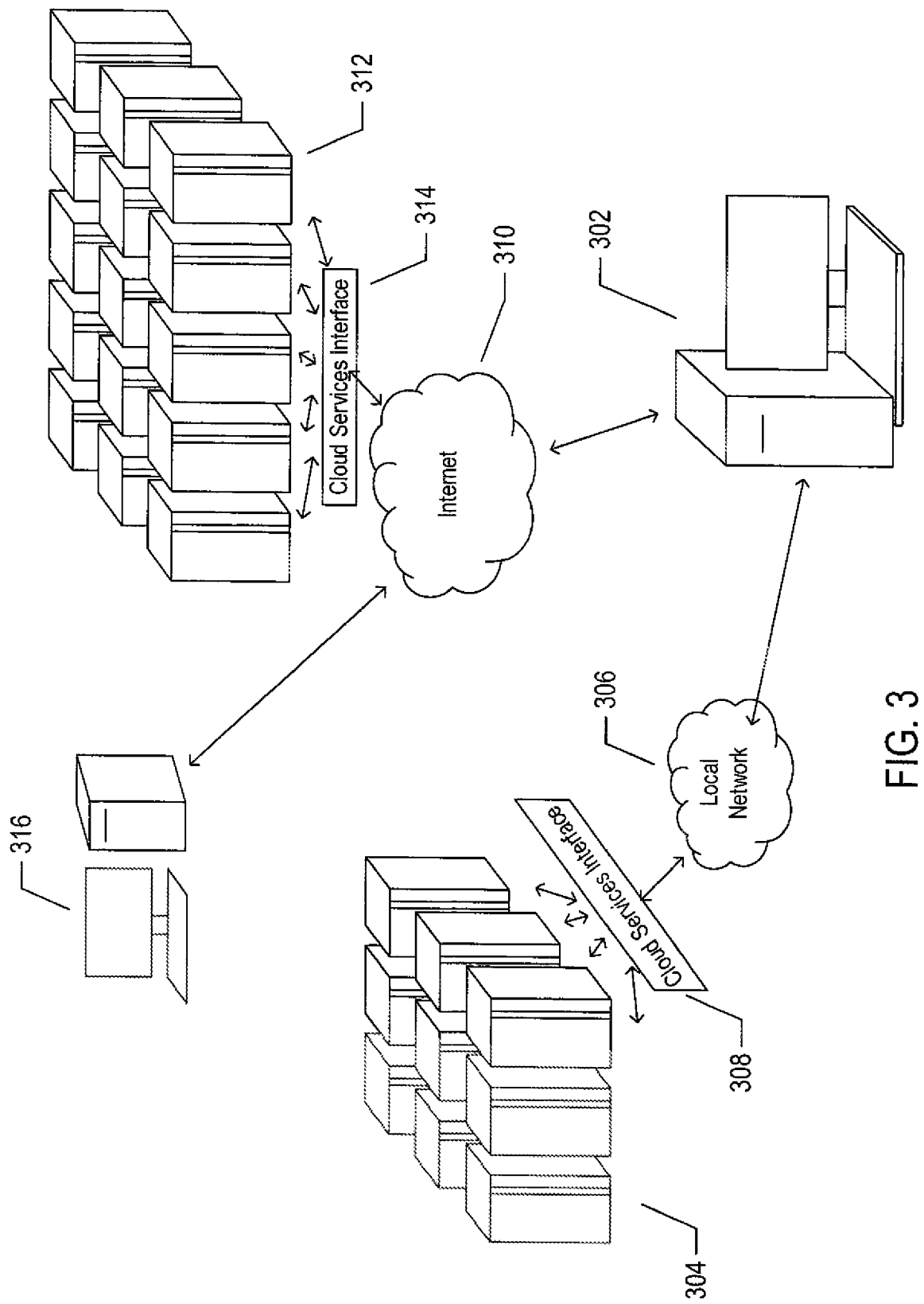
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
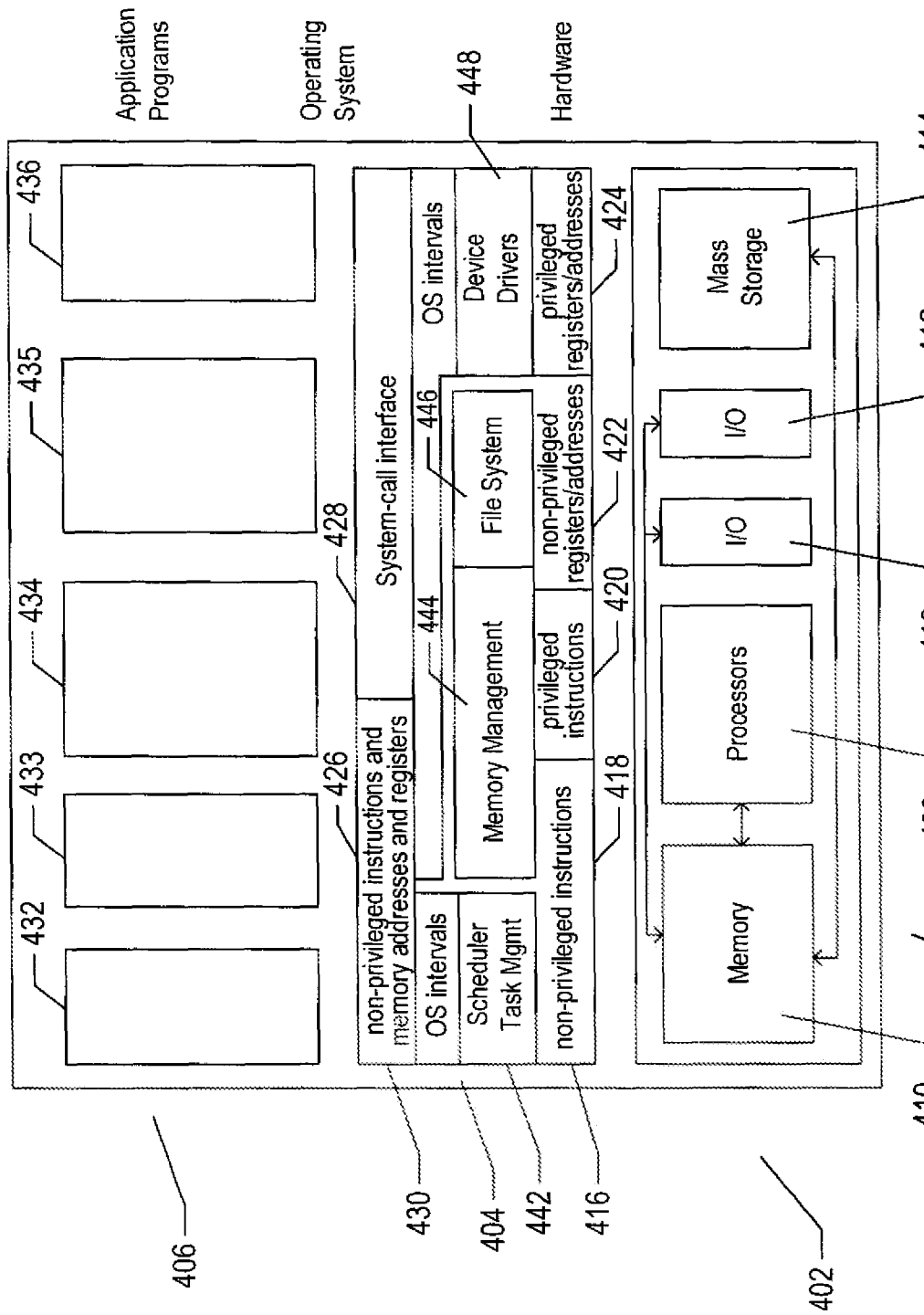
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
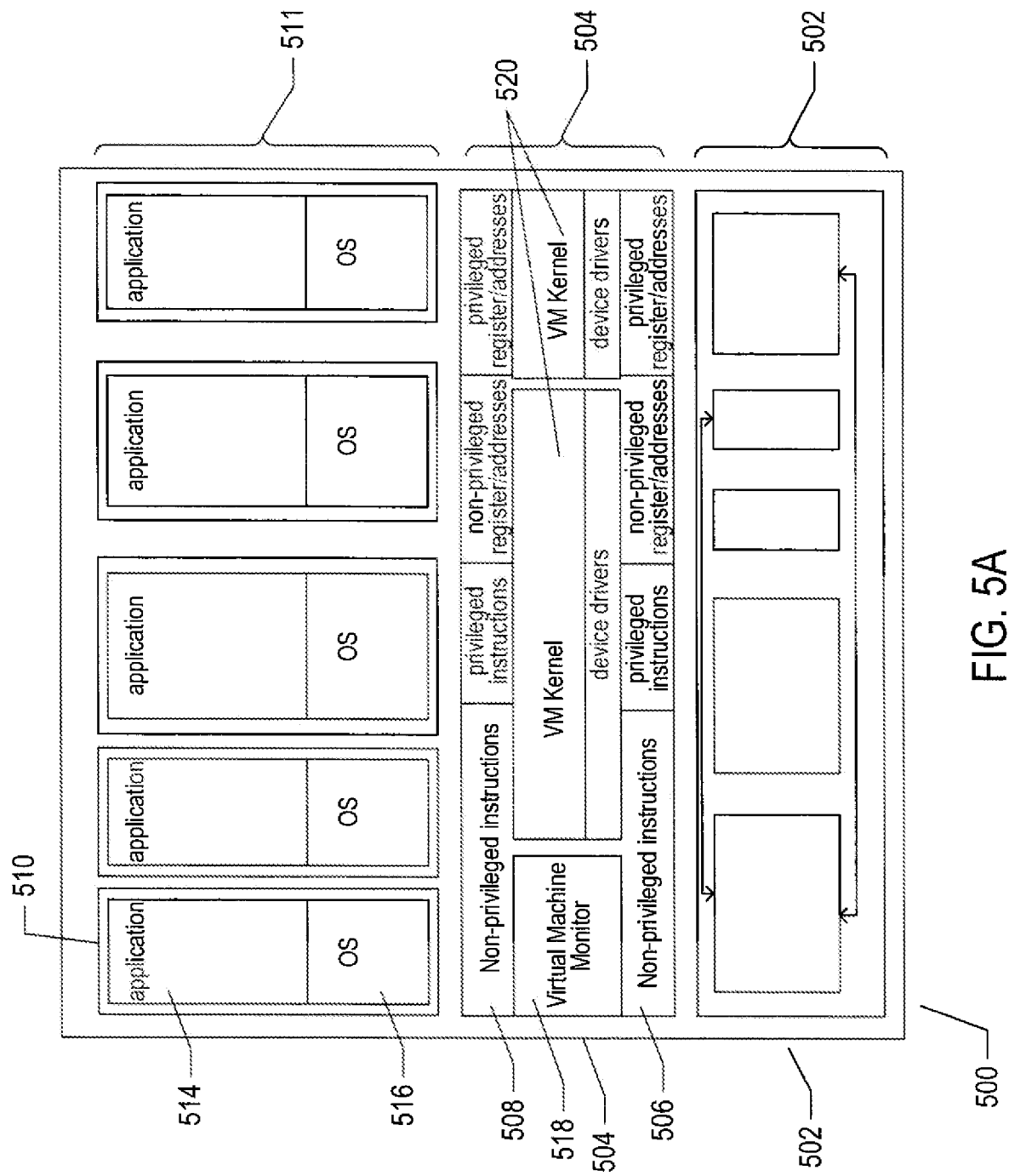
FIGS. 5A-5B show two types of virtual machine ("VM") and VM execution environments.
Figure 5B:
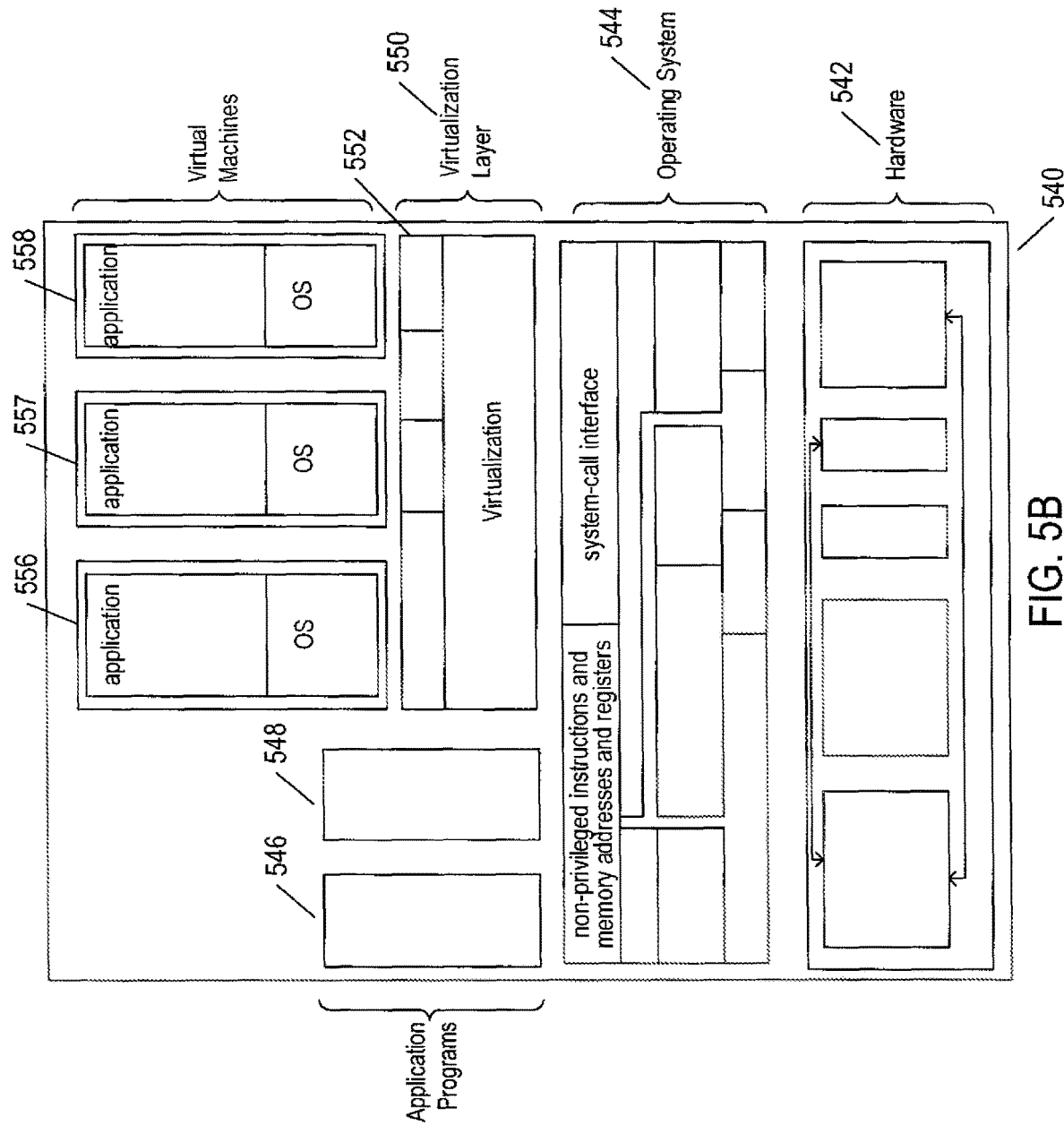

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in Figure 5A features a virtualization layer 504 that interfaces through a virtualization-layer/hardware-layer interface 506, equivalent to interface 416 in FIG. 4, to the hardware. The virtualization layer 504 provides a hardware-like interface to VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data storage devices as well as device drivers that directly control the operation of underlying hardware communications and data storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data storage devices.

Figure 6:
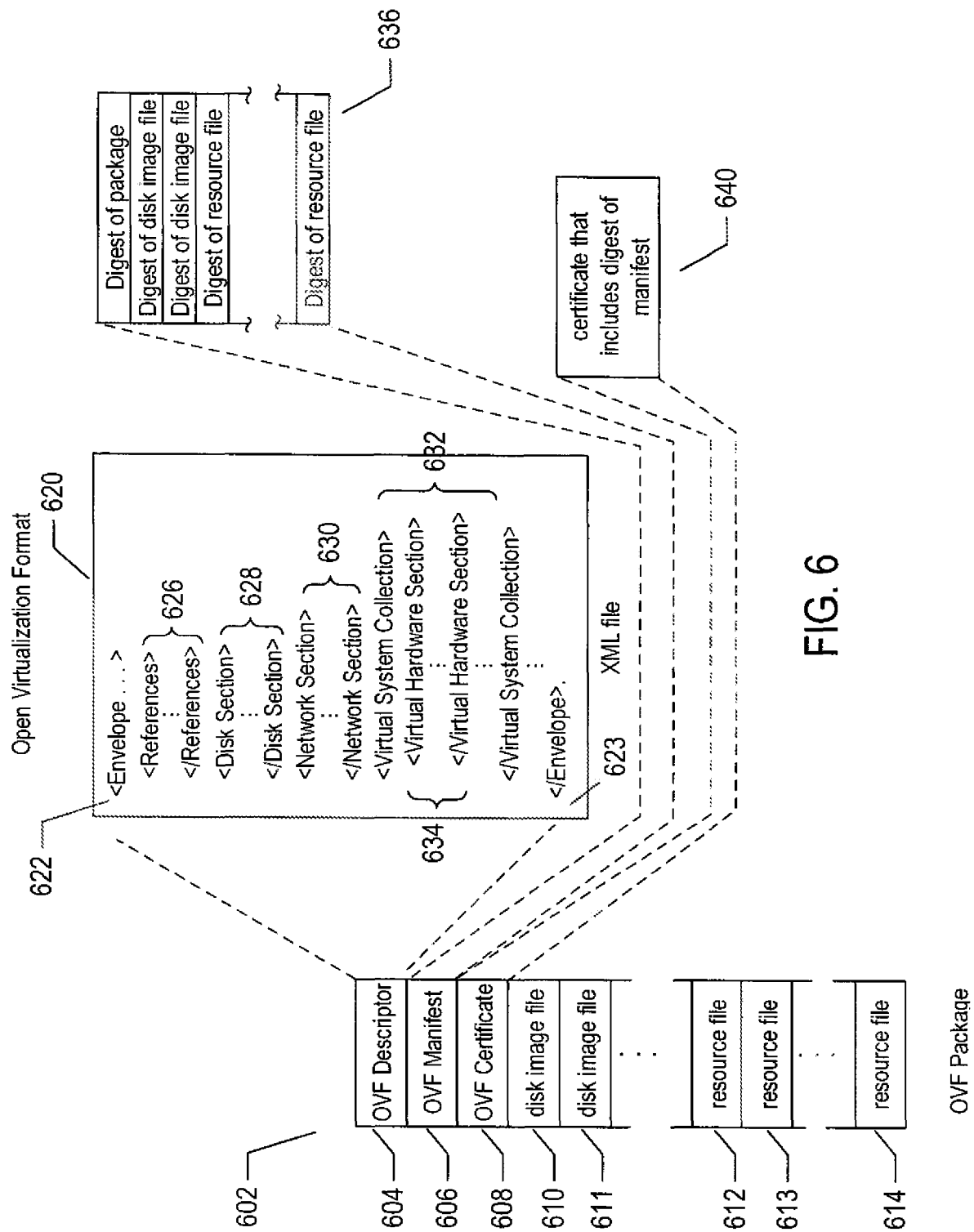
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
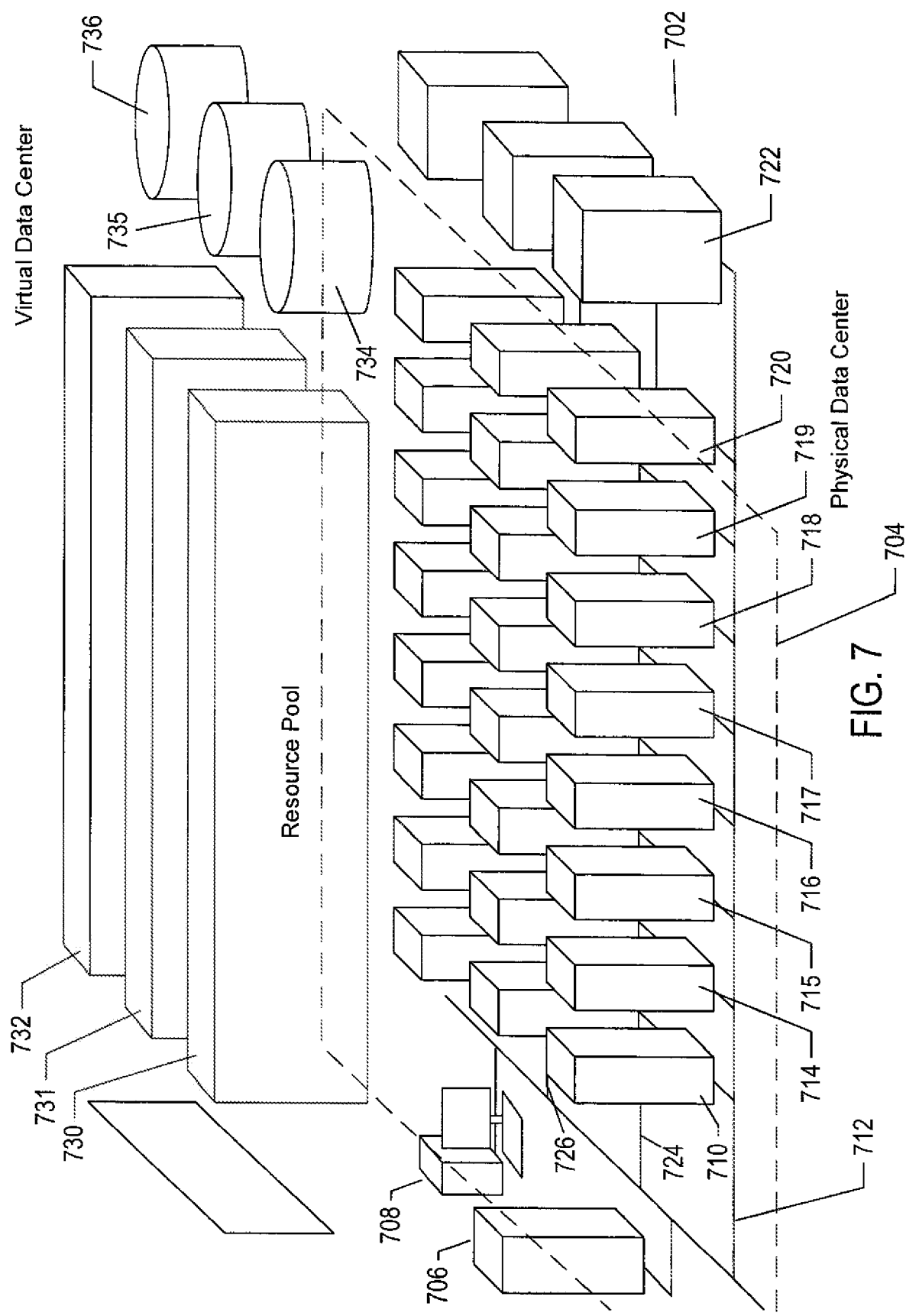
FIG. 7 shows example virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
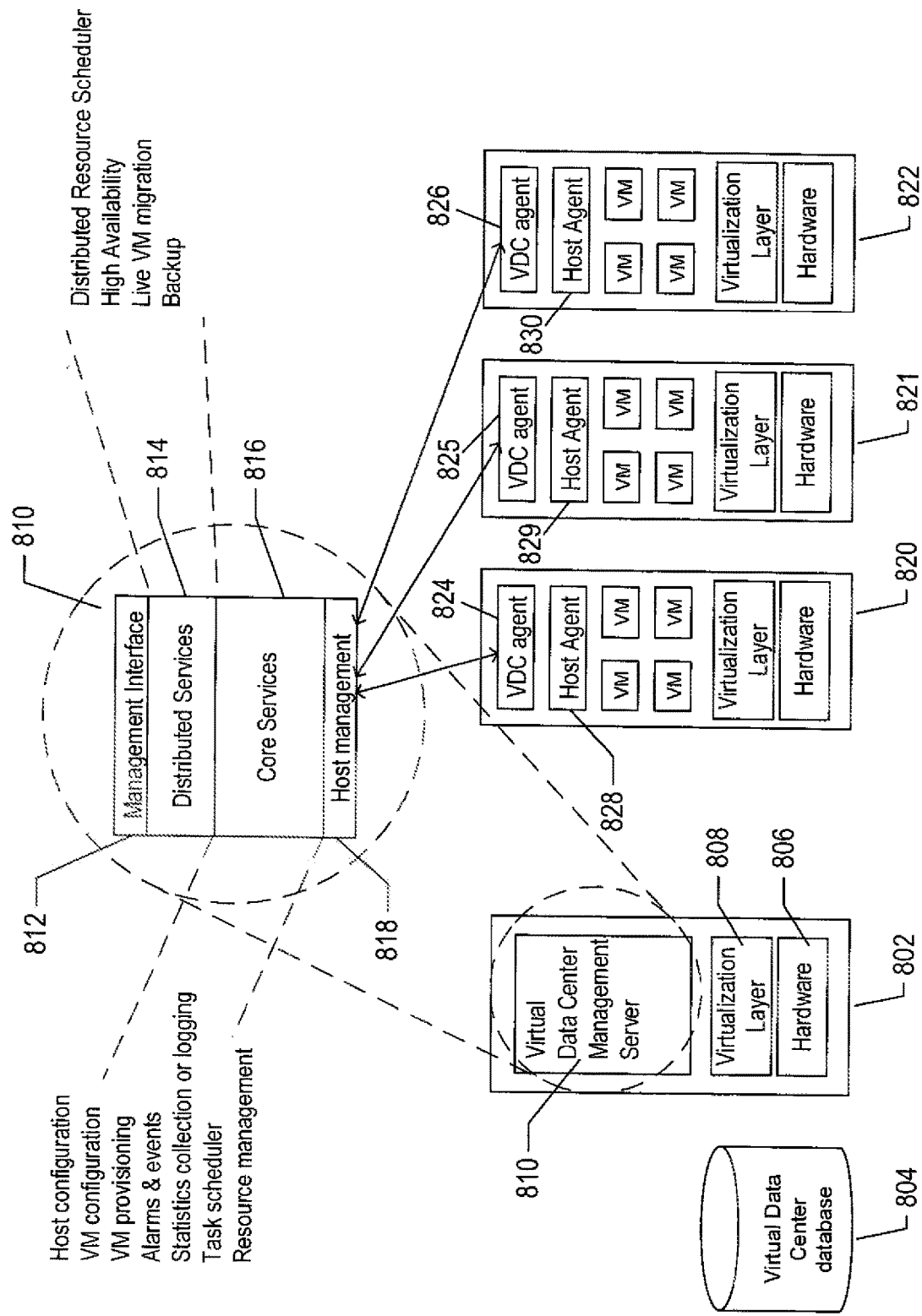
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808 and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for off-loading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
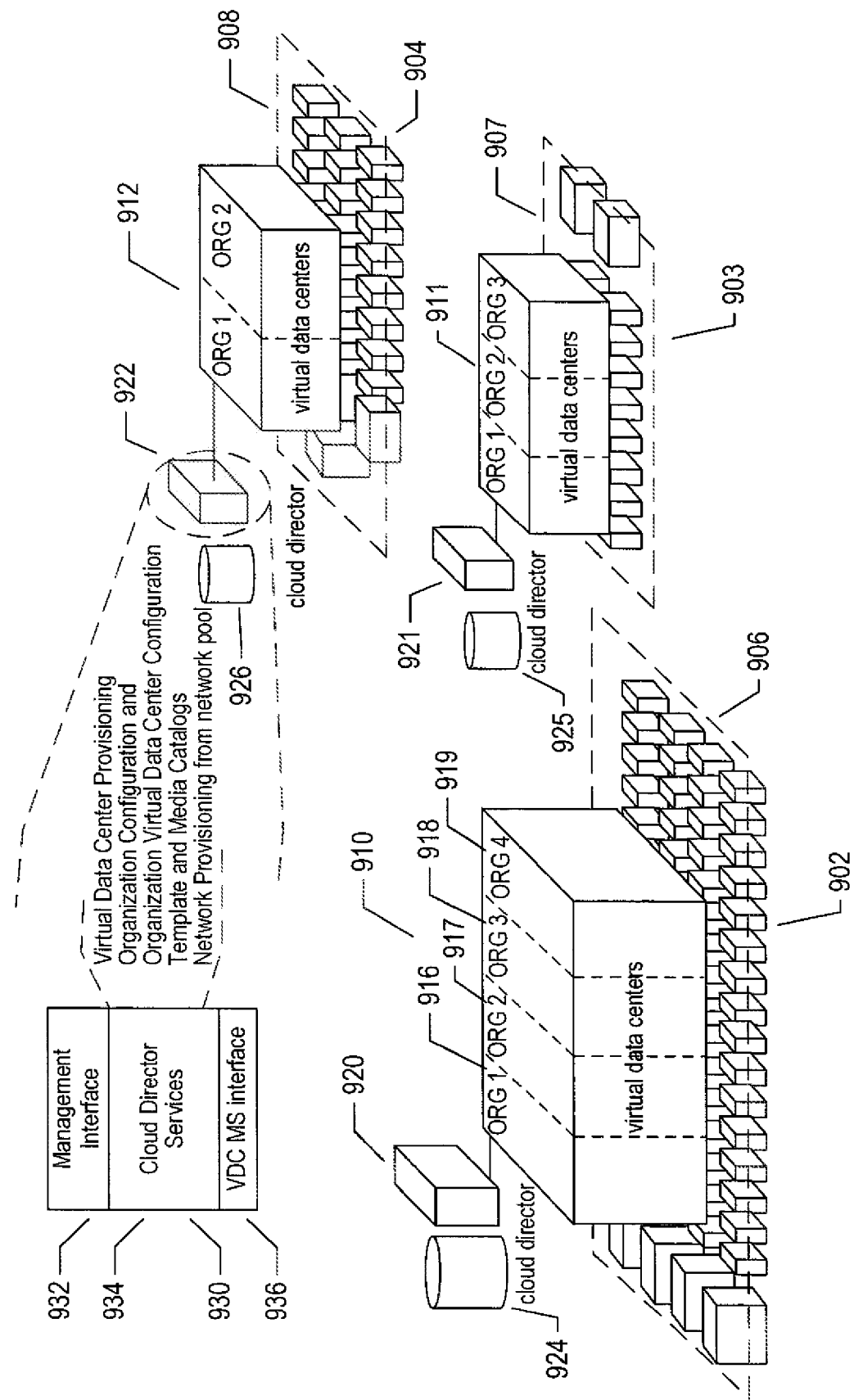
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
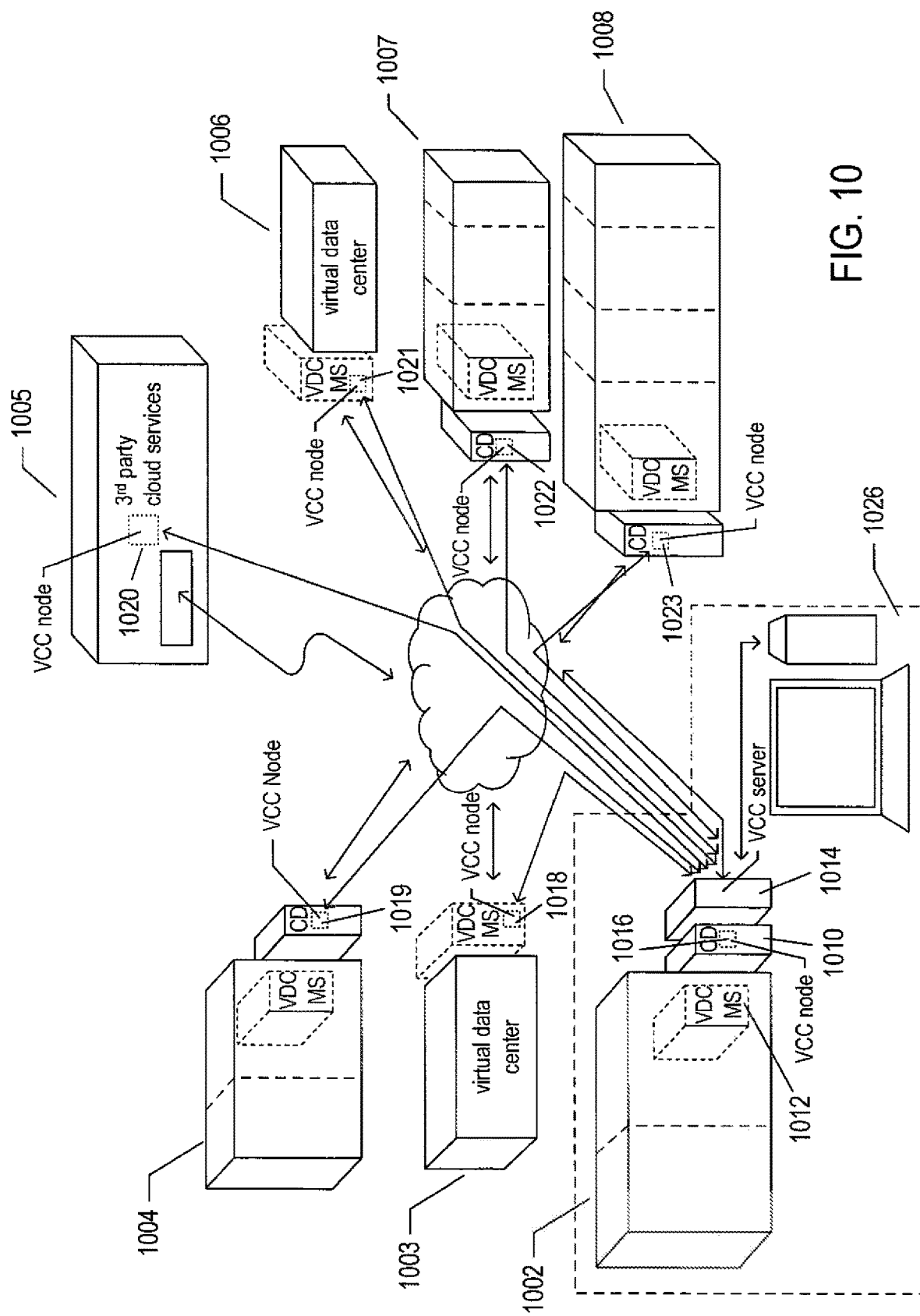
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal. PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files that are not included in the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
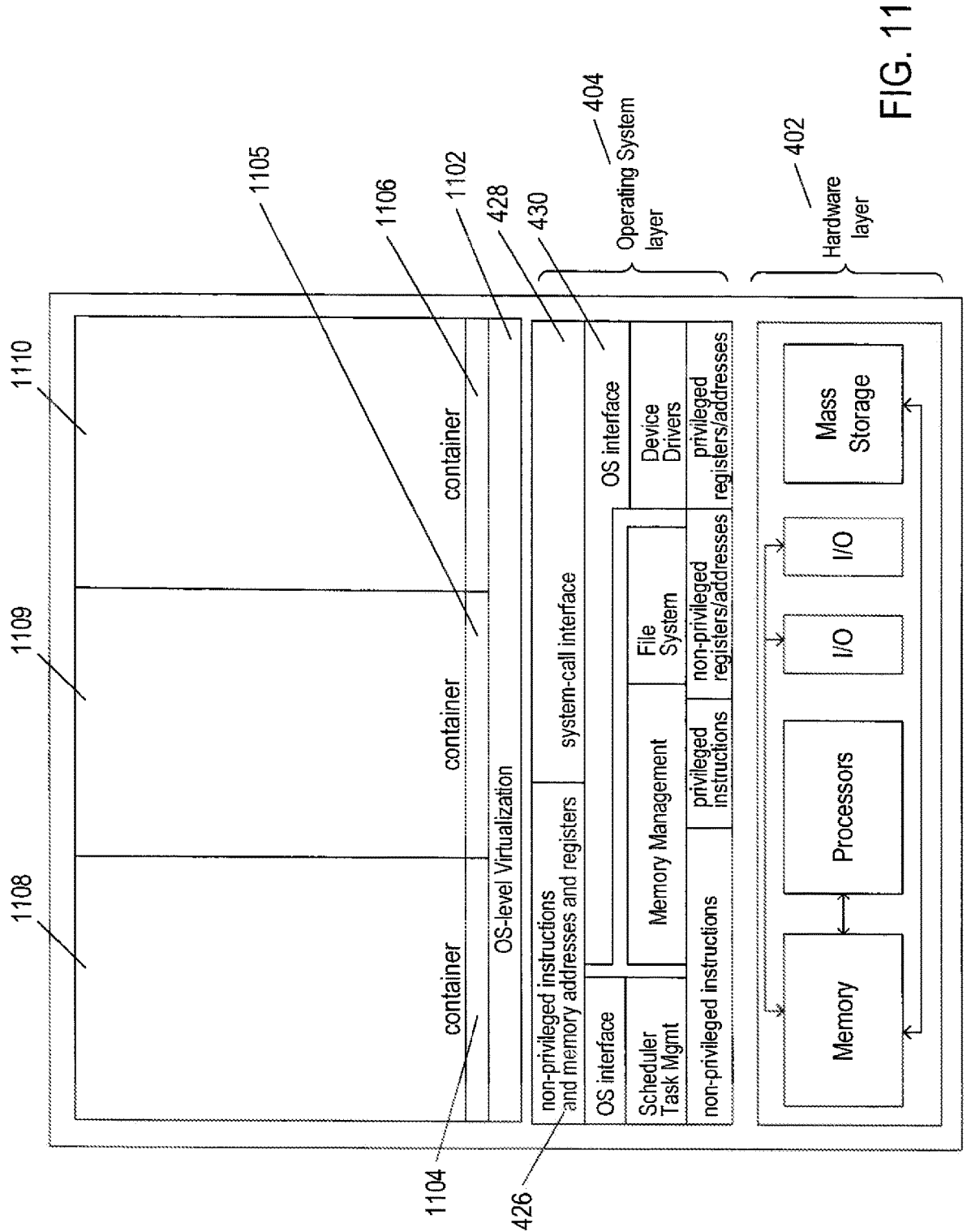
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
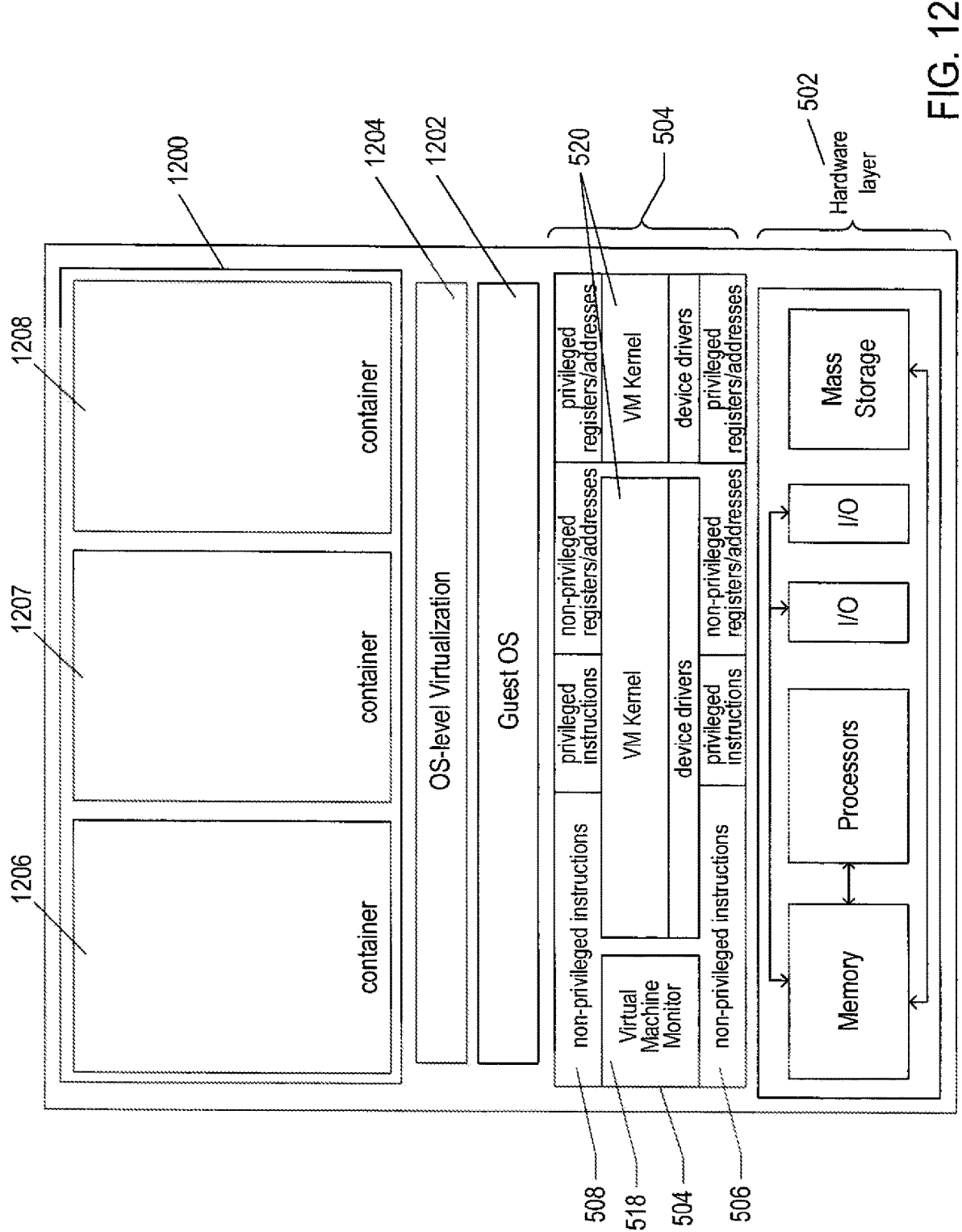
FIG. 12 shows an approach to implementing containers on a VM.

FIG. 12 shows an approach to implementing the containers on a VM. FIG. 12 shows a host computer similar to that shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Log Messages and Log Files

Figure 13:
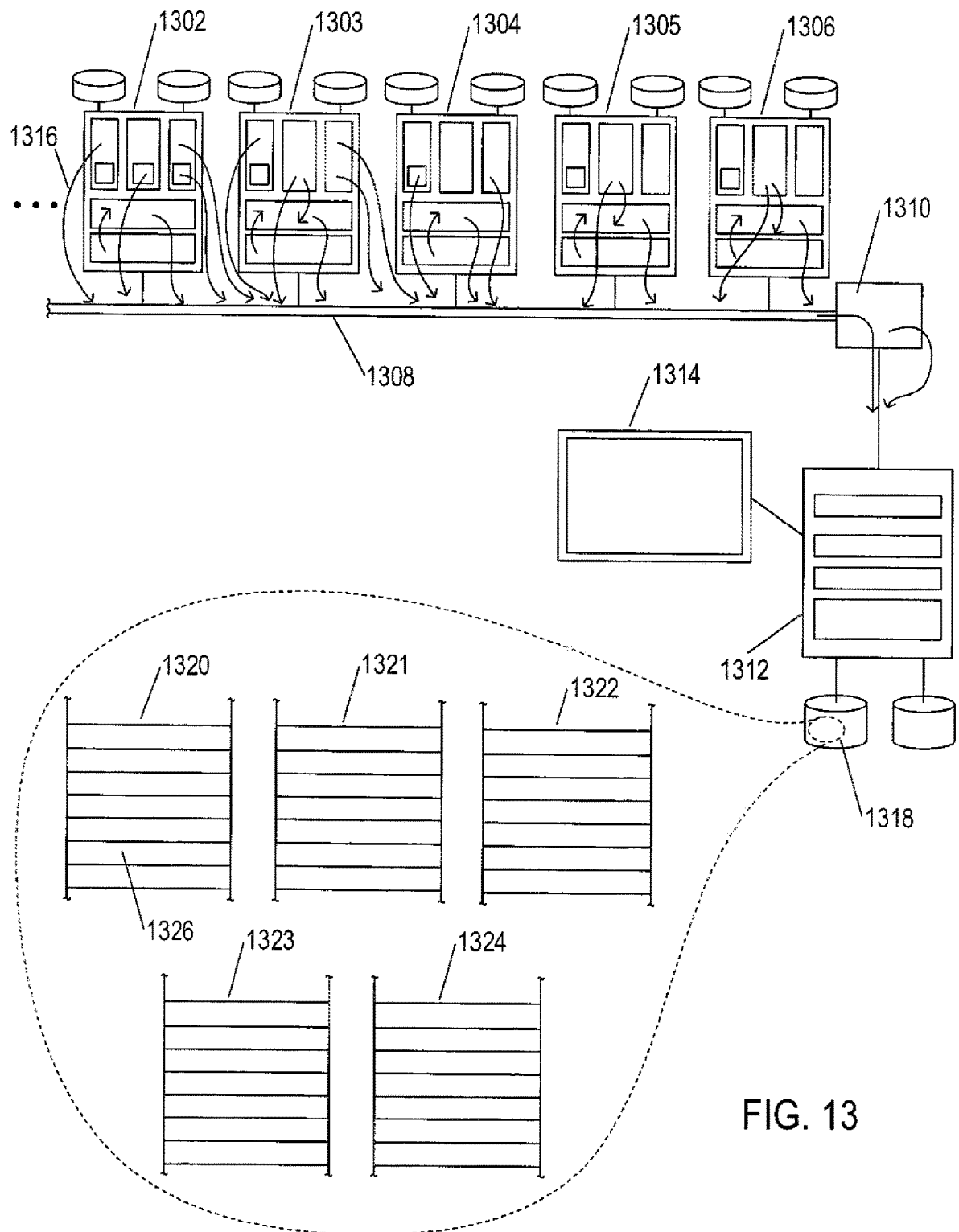
FIG. 13 shows an example of a virtualization layer located above a physical data center.

FIG. 13 shows an example of logging log messages in log files. In FIG. 13, computer systems 1302-1306 within, a distributed computing system are linked together by an electronic communications medium 1308 and additionally linked through a communications bridge/router 1310 to an administration computer system 1312 that includes an administrative console 1314. Each of the computer systems 1302-1306 may run a log monitoring agent that forwards log messages to the log management server executing on the administration computer system 1312. As indicated by curved arrows, such as curved arrow 1316, multiple components within each of the discrete computer systems 1302-1306 as well as the communications bridge/router 1310 generate log messages that are forwarded to the log management server. Log messages may be generated by any event source. Event sources may be, but are not limited to, application programs, operating systems, VMs, guest operating systems, containers, network devices, machine codes, event channels, and other computer programs or processes running on the computer systems 1302-1306, the bridge/router 1310 and any other components of a data center. Log messages may be received by log monitoring agents at various hierarchical levels within a discrete computer system and then forwarded to the log management server executing in the administration computer system 1312. The log management server records the log messages in a data storage device or appliance 1318 as log files 1320-1324. Rectangles, such as rectangle 1326, represent individual log messages. For example, log file 1320 may contain a list of log messages generated within the computer system 1302. Each log monitoring agent has a configuration that includes a log path and a log parser. The log path specifies a unique file system path in terms of a directory tree hierarchy that identifies the storage location of a log file on the administration computer system 1312 or the data storage device 1318. The log monitoring agent receives specific file and event channel log paths to monitor log files and the log parser includes log parsing rules to extract and format lines of the log message into log message fields described below. Each log monitoring agent sends a constructed structured log message to the log management server. The administration computer system 1312 and computer systems 1302-1306 may function without log monitoring agents and a log management server, but with less precision and certainty.

Figure 14:
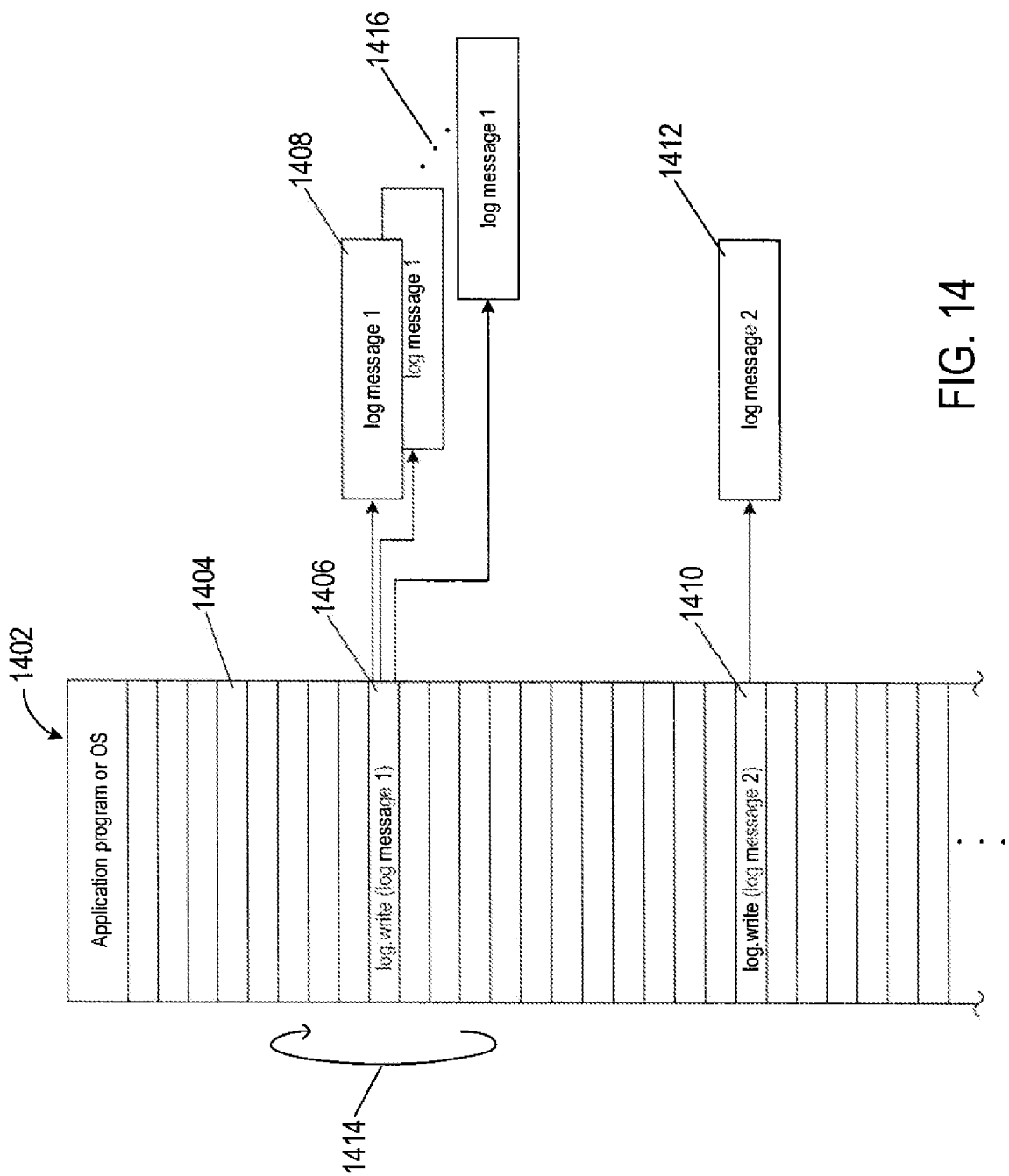
FIG. 14 shows an example of logging log messages in log files.

FIG. 14 shows an example source code 1402 of an event source, such as an application, an operating system, a VM, a guest operating system, or any other computer program or machine code that generates log messages. The source code 1402 is just one example of an event source that generates log messages. Rectangles, such as rectangle 1404, represent a definition, a comment, a statement, or a computer instruction that expresses some action to be executed by a computer. The source code 1402 includes log write instructions that generate log messages when certain events predetermined by a developer occur during execution of the source code 1402. For example, source code 1402 includes an example log write instruction 1406 that when executed generates a "log message 1" represented by rectangle 1408, and a second example log write instruction 1410 that when executed generates "log message 2" represented by rectangle 1412. In the example of FIG. 14, the log write instruction 1408 is embedded within a set of computer instructions that are repeatedly executed in a loop 1414. As shown in FIG. 14, the same log message 1 is repeatedly generated 1416. The same type of log write instructions may also be located in different places throughout the source code, which in turns creates repeats of essentially the same type of log message in the log file.

In FIG. 14, the notation "log.write( )" is a general representation of a log write instruction. In practice, the form of the log write instruction varies for different programming languages. In general, the log write instructions are determined by the developer and unstructured, or semi-structured, and relatively cryptic. For example, log write instructions may include instructions for time stamping the log message and contain a message comprising natural-language words and/or phrases as well as various types of text strings that represent file names, path names, and, perhaps various alphanumeric parameters that may identify objects, such as VMs, containers, or virtual network interfaces. In practice, a log write instruction may also include the name of the source of the log message (e.g., name of the application program, operating system and version, server computer, and network device) and may include the name of the log file to which the log message is recorded. Log write instructions may be written in a source code by the developer of an application program or operating system in order to record the state of the application program or operating system at point in time and to record events that occur while an operating system or application program is executing. For example, a developer may include log write instructions that record informative events including, but are not limited to, identifying startups, shutdowns. 110 operations of applications or devices; errors identifying runtime deviations from normal behavior or unexpected conditions of applications or non-responsive devices; fatal events identifying severe conditions that cause premature termination; and warnings that indicate undesirable or unexpected behaviors that do not rise to the level of errors or fatal events. Problem-related log messages (i.e., log messages indicative of a problem) can be warning log messages, error log messages, and fatal log messages. Informative log messages are indicative of a normal or benign state of an event source.

FIG. 15 shows an example of a log write instruction 1502. The log write instruction 1502 includes arguments identified with "$" that are filled at the time the log message is created. For example, the log write instruction 1502 includes a time-stamp argument 1504, a thread number argument 1506, and an internet protocol ("IP") address argument 1508. The example log write instruction 1502 also includes text strings and natural-language words and phrases that identify the level of importance of the log message 1510 and type of event that triggered the log write instruction, such as "Repair session" 1512. The text strings between brackets "[ ]" represent file-system paths, such as path 1514. When the log write instruction 1502 is executed by a log management agent, parameters are assigned to the arguments and the text strings and natural-language words and phrases are stored as a log message of a log file.

FIG. 16 shows an example of a log message 1602 generated by the log write instruction 1502. The arguments of the log write instruction 1502 may be assigned numerical parameters that are recorded in the log message 1602 at the time the log message is executed by the log management agent. For example, the time stamp 1504, thread 1506, and IP address 1508 arguments of the log write instruction 1502 are assigned corresponding numerical parameters 1604, 1606, and 1608 in the log message 1602. The time stamp 1604 represents the date and time the log message Is generated. The text strings and natural-language words and phrases of the log write instruction 1502 also appear unchanged in the log message 1602 and may be used to identify the type of event (e.g., informative, warning, error, or fatal) that occurred during execution of the event source.

As log messages are received from various event sources, the log messages are stored in corresponding log files in the order in which the log messages are received. FIG. 17 shows a small, eight-entry portion of a log file 1702. In FIG. 17, each rectangular cell, such as rectangular cell 1704, of the log file 1702 represents a single stored log message. For example, log message 1704 includes a short natural-language phrase 1706, date 1708 and time 1710 numerical parameters, and an alphanumeric parameter 1712 that identify a particular host computer.

Computer-Implemented Methods and System for Reducing Volumes of Log Messages Sent to a Data Center Organizations increasingly use data centers to store and process data produced by computer systems located outside of data centers. The outside computer systems are called "edge systems." Typical edge systems generate log messages that are sent each day to a data center, where the log messages are stored and examined to identify the root cause of a performance problem with hardware and applications executed at the edge systems. However, storing large volumes of log messages in a data center is expensive and processes performed to troubleshoot a performance problem based on millions of log messages is time consuming and labor intensive. For example, the cost of storing log messages significantly increases when a burst of log messages generated at one or more edge systems occurs because of a coding error in a sub-routine or a patch applied to software executing at the edge systems. Moreover, troubleshooting a performance problem is often performed by different teams of engineers, including a field team, an escalation team, and a research and development team. Within each team, the search for a root cause is gradually narrowed by filtering millions of log messages sent to the data center through different sub-teams that search for specific problems. The troubleshooting process can take weeks, and in some cases, months. These long periods spent troubleshooting a performance problem often leads to increased cost for the organization and can lead to mistakes in processing transactions and denying people access to vital services provided by an organization, which can damage an organization's reputation and result in lost revenue for the organization.

Figure 18:
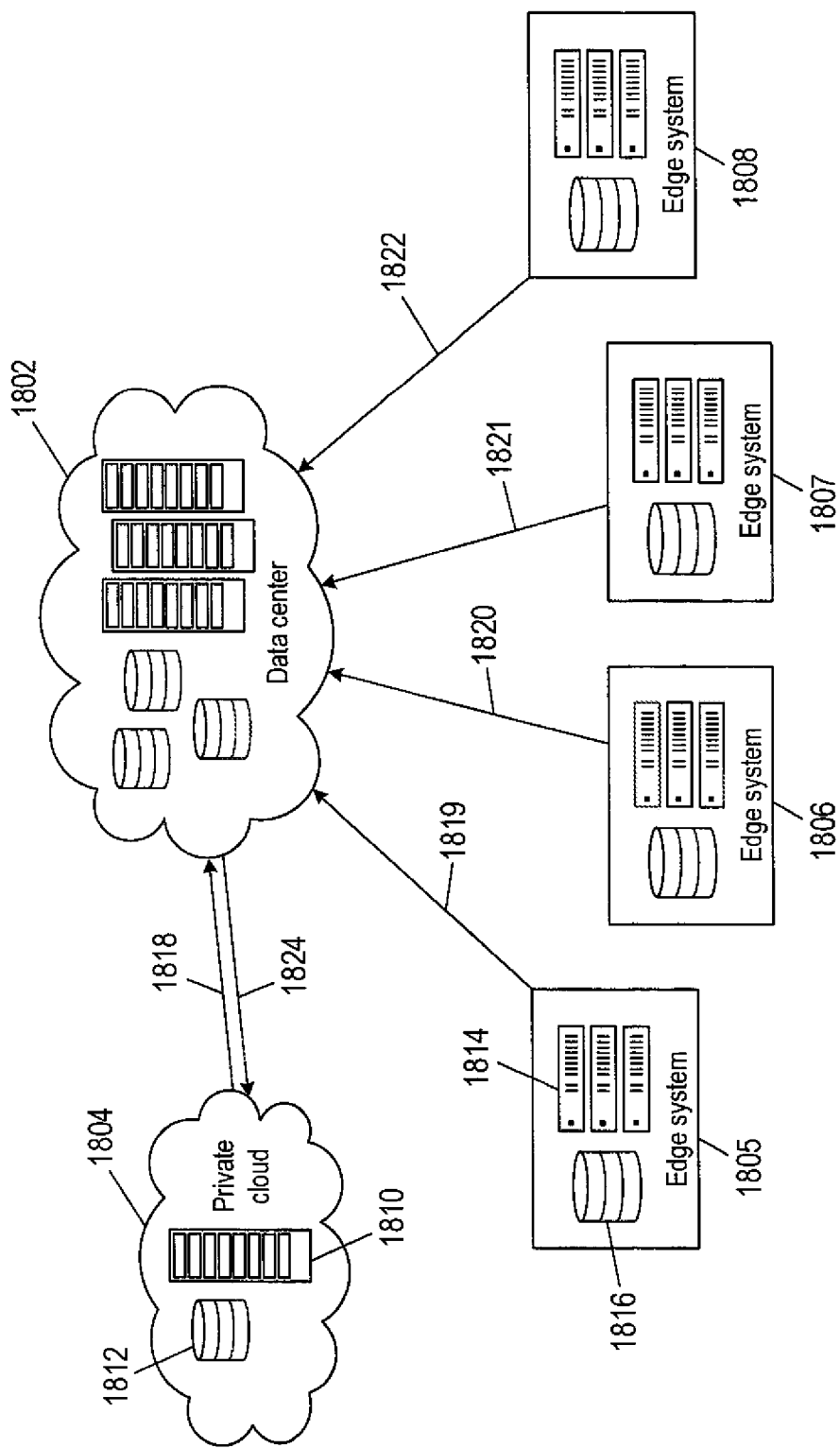
FIG. 18 shows an example of a data center that receives log messages from edge systems.

FIG. 18 shows an example of a data center 1802 that receives log messages from edge systems 1804-1808. The edge system 1804 represents a private cloud of an organization and edge systems 1804-1808 comprise computer systems and data bases that are owned by the organization and are placed at different locations. The organization may be, for example, a retailer with the private cloud 1804 located at the retailer's headquarters and the edge systems 1805-1808 are located at different store locations. Each edge system runs applications that complete transactions with banks, manage accounting, manage employee scheduling and hours, maintain records of product purchases, inventory of products at a store location, and coordinate with various vendors to purchase products. Each of these operations generates a multitude of log messages that are sent from the edge systems to the data center 1802 as represented by directional arrows 1818-1821. An anomaly in a sub-routine or patch applied to the software executing in one or more of the edge systems creates burst in log messages that are sent to the data center 1802. The retailer pays for use of the large computational and storage capacity of the data center 1802 to store and process the log messages generated by the edge systems 1804-1808. However, storing large volumes of log messages in a data center is expensive and troubleshooting a root cause at any one of the edge systems 1804-1808 is time consuming. Results of processing the log messages are sent 1824 to the private cloud 1804.

Computer-implemented methods and systems described below significantly reduce volumes of log messages sent from edge systems to a data center. Each edge system includes a log agent that locally stores and processes log messages to identify representative log messages, which are a fraction of the total number of log messages typically generated at each edge system. The representative log message may be important in detecting performance problems at the edge systems. The representative log messages are sent to the data center and may be used to determine remedial measures for correcting a performance problem. Non-representative log message may be discarded at the edge systems, resulting in a significant reduction in the number of log messages stored and processed at the data center. For example, most log messages record benign events, such as I/O operations, client requests, logins, logouts, and statistical information about the execution or applications, operating systems, computer systems, and other devices of a data center. Other log messages record diagnostic information, such as alarms, warnings, errors, or emergencies, that may be used to determine a root cause of a problem in the execution of applications, operating systems, and computer systems running at an edge system. Edge systems employ log agents that identify representative log messages that record benign and diagnostic information and store the representative log messages in a data center, thereby significantly reducing the volume of log messages stored in the data center.

Figure 19:
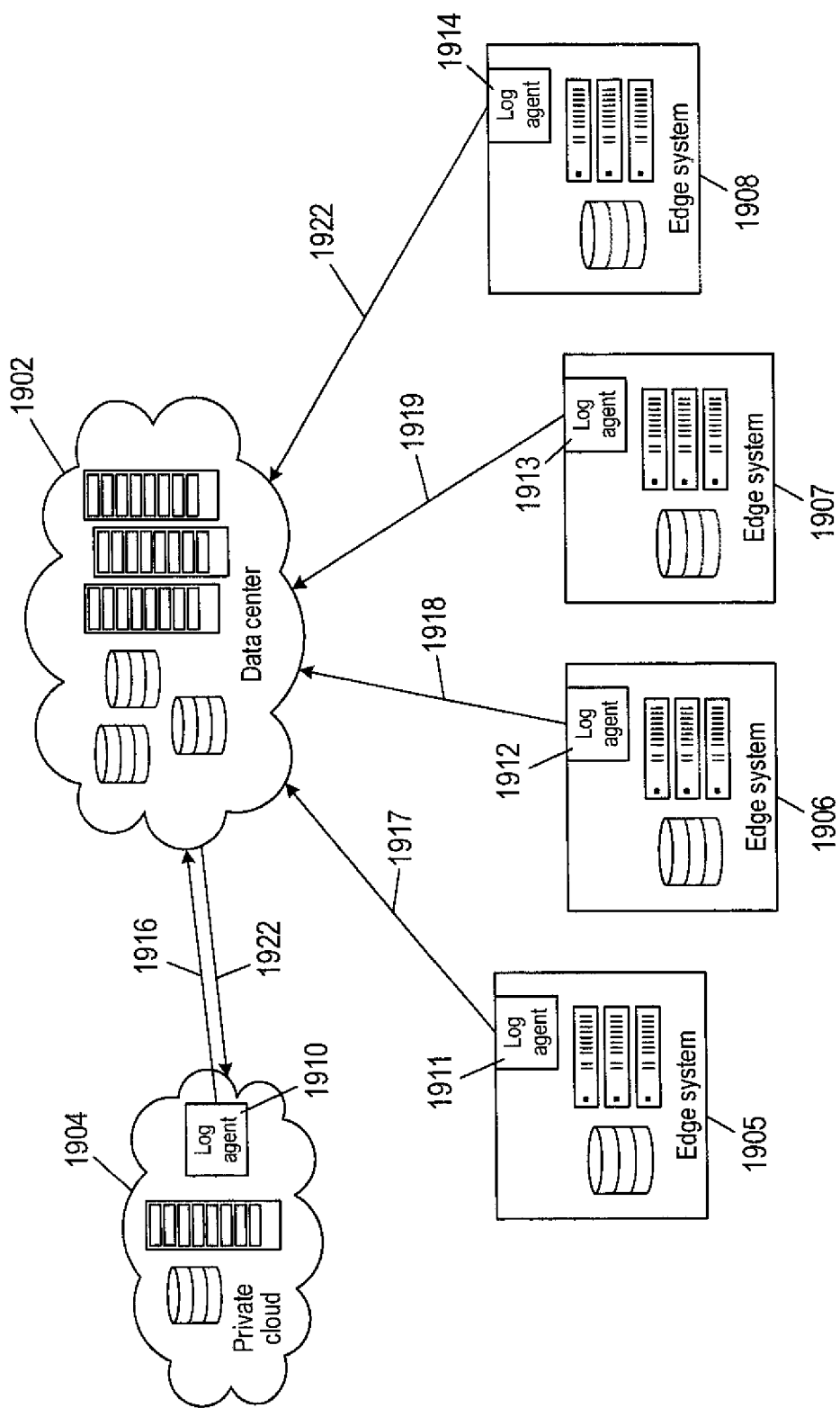
FIG. 19 shows an example of a data center that receives only representative log message produced by agents of edge systems.

FIG. 19 shows an example of a data center 1902 that receives only representative log message produced by agents of edge systems 1904-1908. The edge systems 1904-1908 include corresponding log agents 1910-1914 that collect log messages generated by various log sources of corresponding edge systems, perform methods described below to identify representative log message, and only send the representative log message to the data center 1902 for storage. For example, log agent 1912 executes the methods described below to determine representative log messages produced by log sources executing on the edge system 1906. The representative log messages may record information that can be used to diagnose a performance problem at the edge system 1906. The representative log messages are sent by the log agent 1912 to the data center 1902 over the Internet to the data center 1902, where the representative log messages are stored in one or more data storage devices of the data center 1902. The log agent 1912 discards non-representative log messages. The data center 1902 may perform operations that detect and identify the root cause of problems at the edge systems 1904-1908 and generate recommendations and/or remedial measures that correct the performance problems. The remedial measures may be executed at the edge systems to correct the performance problems. For example, the types of performance problems detected in representative log messages include changes to a sub-routine of a computer program running at the edge system, patches to programs running at the edge systems, starting up of new applications on the edge system, or shutting down applications on the edge system. The remedial measures sent from the data center and executed at the edge system to correct such performance problems include backing out the changes to the sub-routine, backing out the patches, applying patches to correct the new application, or restarting applications that have been shut down.

Figure 20:
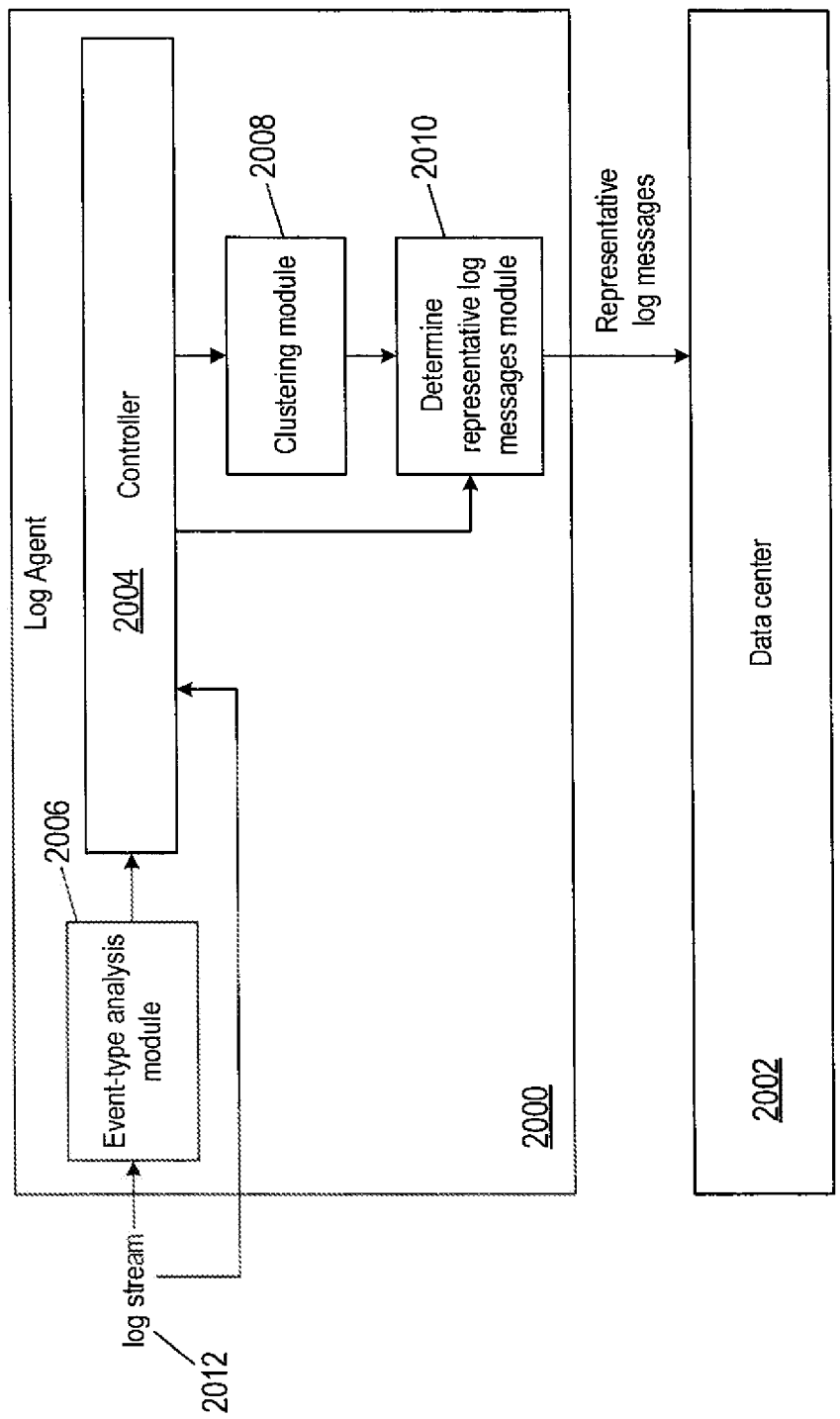
FIG. 20 shows an example architecture of a log agent that sends representative log message generated by an edge system to a data center.

FIG. 20 shows an example architecture of a log agent 2000 that sends representative log message generated by an edge system to a data center 2002. The agent 2000 comprises a controller 2004, an even-type analysis module 2006, a clustering module 2008, and a determine representative log messages module 2010. Each module executes computational operations that are described separately below. The agent 2000 receives as input a stream of log messages 2010 from event sources of an edge system. In one implementation, the modules 2006, 2008, and 2010 process log messages in intervals. For example, the modules 2006, 2008 and 2010 determine representative log messages of the log stream 2012 with time stamps t in a time interval $(t_{p-1}, t_p)$, where $t_{p-1}$ is a lower time limit and $t_p$ is an upper time limit and subscript p is a time interval index. For example, the duration of the time interval $(t_{p-1}, t_p]$ may be 10 seconds, 20 seconds, 30 seconds, 1 minute, 5 minutes or longer. In another implementation, rather than using time intervals, the modules 2006, 2008, and 2010 identify send representative log messages for every 1 GB of log messages. In block 2006, an event type is extracted from each log message in the stream of log messages 2012. Each event type corresponds to a specific log write instruction of an event source.

Figure 21:
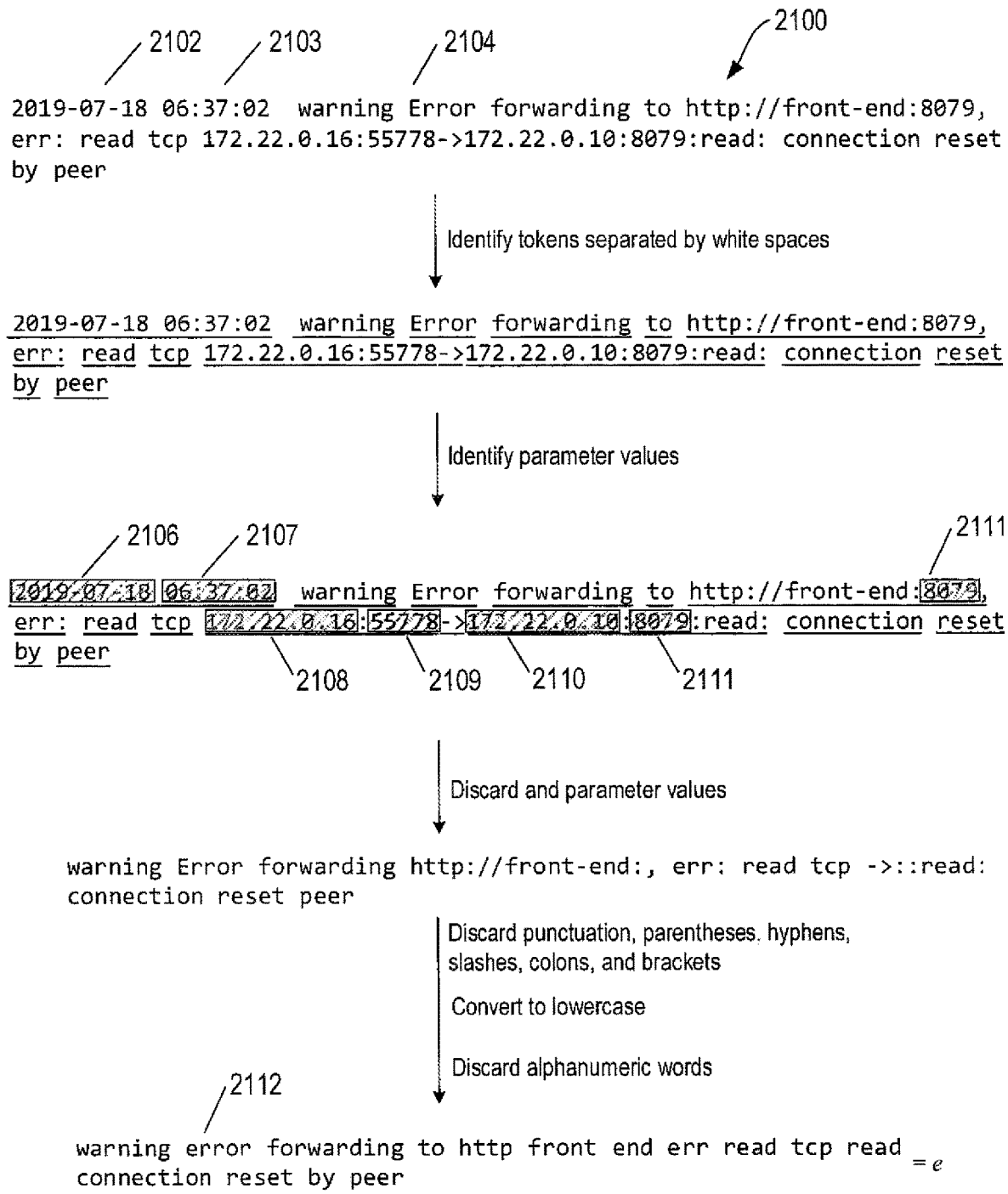
FIG. 21 shows an example of event-type analysis performed by the event-type analysis module on an example log message.

FIG. 21 shows an example of event-type analysis performed by the event-type analysis module 2006 on an example log message 2100. The log message 2100 is tokenized by identifying tokens separated by non-printed characters called "white spaces." In this example, tokenization of the log message 2100 is illustrated by underlining of the printed or visible tokens comprised of characters. For example, tokens include the date 2102, time 2103, and words 2104 that are underlined. Next, a token-recognition pass is made to identify parameters. Parameters are tokens, or message fields, that are likely to be highly variable over a set of messages of a particular type, such as date, time, and IP addresses. Parametric tokens are identified by shading, such as shaded rectangle 2106-2111. Parametric tokens may be discarded leaving the non-parametric text strings, natural language words and phrases, punctuation, parentheses, and brackets. In other implementations, stop words may also be identified and discarded. Stop words are common words, such as "they," "are," "do," etc. that do cam useful information. Various types of symbolically encoded values, including dates, times, machine addresses, network addresses, and other such parameters can be recognized using regular expressions or programmatically. A program or a set of regular expressions can be used to recognize symbolically encoded dates and times in any of the common formats. It is possible that the token-recognition process may incorrectly determine that an arbitrary alphanumeric string represents some type of symbolically encoded parameter when, in fact, the alphanumeric string only coincidentally has a form that can be interpreted to be a parameter. The currently described methods and systems do not depend on absolute precision and reliability of the event-message-preparation process. Occasional misinterpretations may result in mischaracterizing log messages. The log message 2100 is subject to textualization in which an additional token-recognition step of the non-parametric portions of the log message is performed in order to discard punctuation and separation symbols, such as parentheses and brackets, commas, colons, and dashes that occur as separate tokens or that occur at the leading and trailing extremities of previously recognized non-parametric tokens. Uppercase letters may be converted to lowercase letters. The event-type analysis produces an event type 2112 comprising non-parametric words. The event type 2112 represents the message portion of the log message 2100 and other log messages generated by the same log-write instructions. Log messages generated by similar log write instructions may belong to the same event. In the following discussion, event types are denoted by e.

Figure 22:
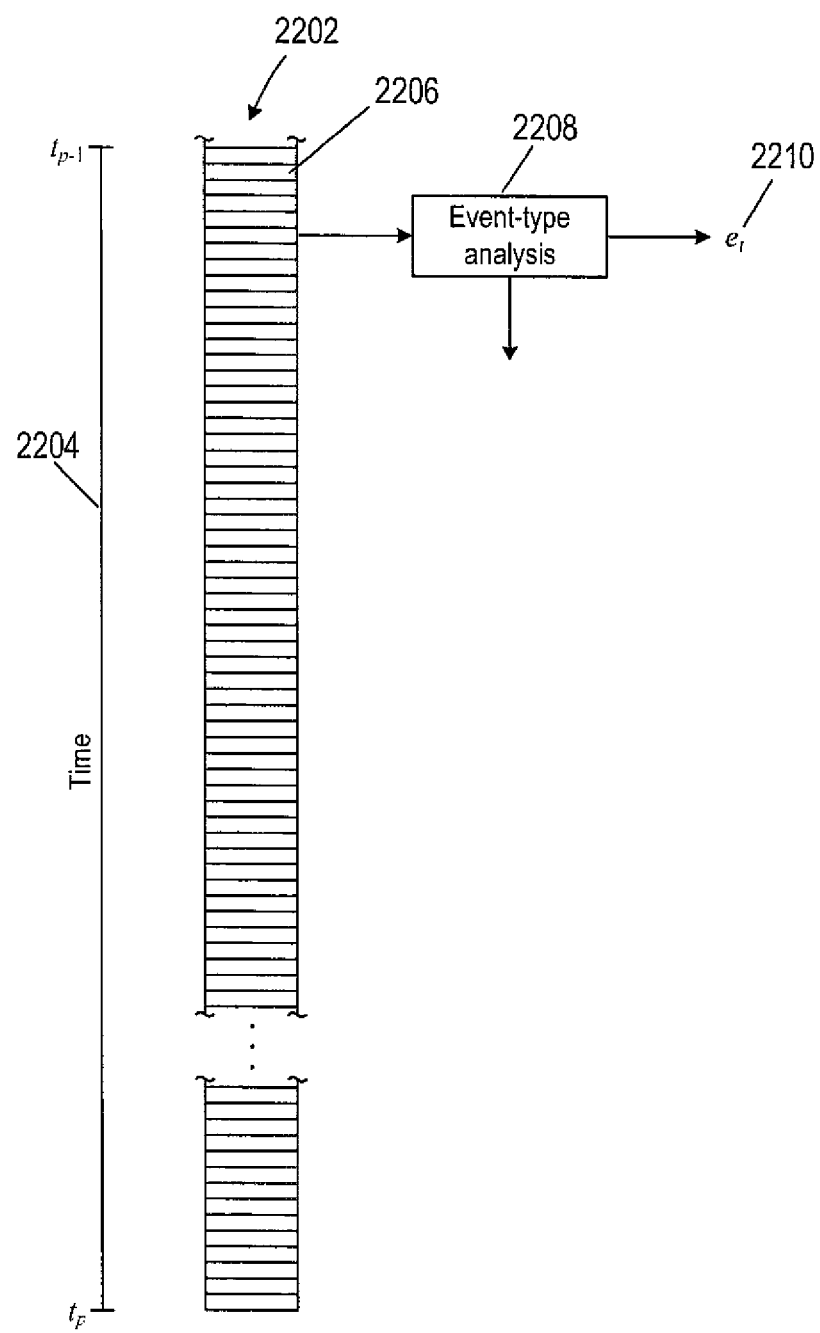
FIG. 22 shows an example of determining event types of log messages in a time interval.

FIG. 22 shows an example of determining event types of log messages in the time interval $(t_{p-1}, t_p]$. A column of rectangles 2202 represents the log messages received in the time interval $(t_{p-1}, t_p]$ 2204. In another implementation, events of the log message may applied to groups comprising N log messages. Each rectangle, such as rectangle 2206, represents a log message. The event-type analysis in block 2208 represents the operation performed by the event-type analysis module 2006 in generating an event type $e_i$ 2210 as described above with reference to FIG. 21.

Returning to FIG. 20, the event types generated in block 2006 and the log messages are sent to the controller 2004. The controller 2004 manages and directs the flow of log messages and event types. The controller 2004 sends the event types generated by the event-type analysis module 2006 to the clustering module 2008.

Figure 23:
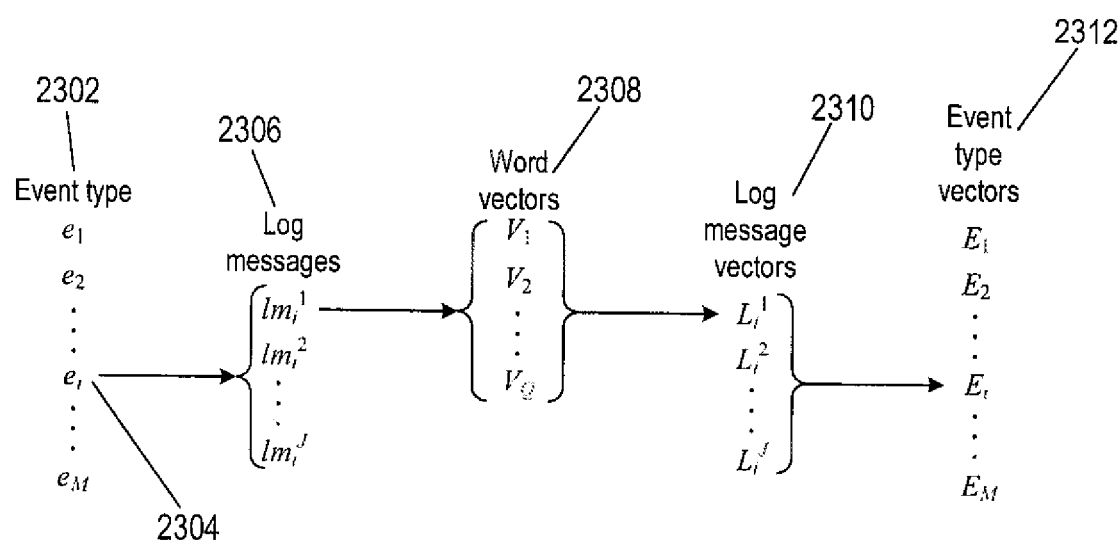
FIG. 23 shows an overview of a process for vectorizing event types.

FIGS. 23-25B show examples of operations performed by the cluster module 2008 on the event types output from the event-type analysis module 2006. FIG. 23 shows an overview of a process for vectorizing the event types generated by the edge system in the time interval $(t_{p-1}, t_p]$. Column 2302 contains an example list of the M different event types of the log messages with time stamps in the time interval $(t_{p-1}, t_p]$. For example, event type $e_i$ 2304 of one or more log messages generated in the time interval $(t_{p-1}, t_p]$. Column 2306 list the log messages with the event type $e_i$ 2304. The log messages are denoted by $lm_i^2, \ldots, lm_i^J$, where the subscript i corresponds to the event type $e_i$ 2304 and the superscripts are log message indices that distinguish the log messages associated with the event type $e_i$ 2304. Each log message contains Q words, where Q is a positive integer. The Q words of the log messages are assigned vectors in a multidimensional space. Column 2308 list Q word vectors associated with the log message $lm_i^1$, where the Q word vectors are denoted by $V_1, \ldots, V_Q$. In the following discussion, uppercase letters are used to represent vectors. The q-th word vector is denoted by $$V_q = \begin{bmatrix} v_{q,1} \\ \vdots \\ v_{q,N_e} \end{bmatrix} \tag{1a}$$

where
$N_e$ is the number of elements in each word vector (i.e., $N_e$-dimensional space);
$V_{q,1}, \ldots, v_{q,N_e}$ are numerical values; and
$q=1, 2, \ldots, Q$.

The word vectors in column 2308 are used to compute log message vectors denoted by $L_i^1, L_i^2, \ldots, L_i^J$, where the subscript i corresponds to the event type $e_i$ 2304 and the superscripts correspond to the log message superscripts. A log message vector is computed as an average of the word vectors of the event type $e_i$ 2304 as follows:

$$L_i^j = \begin{bmatrix} l_{i,1}^j \\ \vdots \\ l_{i,N_e}^j \end{bmatrix} \tag{1b}$$

where $$l_{i,n}^j = \frac{1}{Q}\sum_{n=1}^{Q} v_{q,n}$$

Column 2310 comprises the log messages vectors associate with the log messages 2306. Event type vectors are computed for each of the event types by computing an average of the log message vectors associated with each event type vector as follows:

$$E_i = \begin{bmatrix} e_{i,1} \\ \vdots \\ e_{i,N_e} \end{bmatrix} \quad (1c)$$

where $$e_{i,n} = \frac{1}{J}\sum_{j=1}^{J} l_{i,n}^j$$

Column 2312 comprises event type vectors that correspond to the event types listed in column 2302 with the event type $e_i$ represented by the event type vector $E_i$.

FIG. 24 shows a numerical example of computing an event type vector for a simple example event type. The event type $e_i$ corresponds to cpu utilization and has four corresponding example log messages $lm_i^1$, $lm_i^2$, $lm_i^3$, and $lm_i^4$. The words of the log messages are represented by three-dimensional words vectors 2401-2405. In this example, the word vectors correspond to points in a three-dimensional space. Implementations are not limited to a three-dimensional space. In other implementations, higher dimensional spaces may be used to represent the words vectors. Log messages vectors $L_i^1$, $L_i^2$, $Lm_i^3$, and $L_i^4$ are computed by an average of corresponding components of the word vectors according to Equation (1b). For example, log message vector $L_i^3$ is the average of corresponding components of the word vectors cpu 2401, utilization 2402, and warning 2403. The event type vector $E_i$ corresponds to the event type $e_i$ and is determined by computing the average of corresponding components of the log message vectors $L_i^1$, $L_i^2$, $L_i^3$, and $L_i^4$ according to Equation (1c).

Figures 25A, 25B:
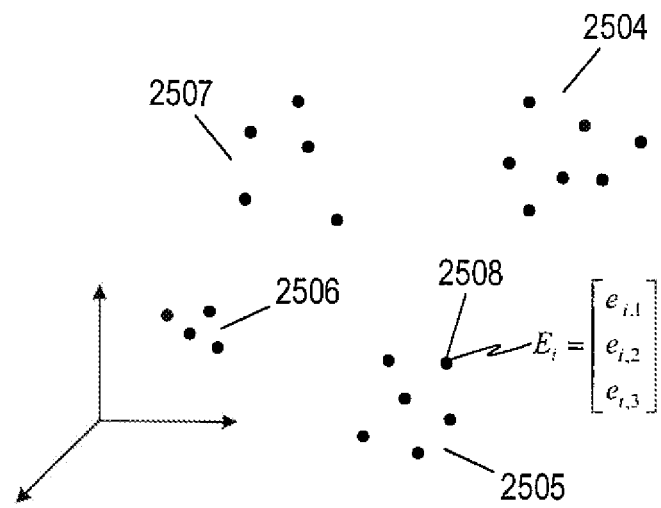
FIG. 25A shows three examples of semantically similar event types.
FIG. 25B shows a representation of four example clusters of event types in three-dimensions.

Clustering module 2008 determines clusters of semantically similar event types based on a user-selected number of clusters denoted by K. FIG. 25A shows three examples of semantically similar event types 2501-2503. Each of the event types have in common the phrase "warning error forwarding to http front end err" and differ with respect to other words. Other semantically similar event types include event types comprising a set of tokens with and without parsed regular expressions removed. For example, event types with "warning host x.x.x.x. shut down," where x.x.x.x represents a host IP address, are semantically similar event types because the event types all include the common set of non-parametric tokens "warning host shut down." The clustering module 2009 uses K-means clustering to determine clusters of semantically similar event types (i.e., determine clusters of semantically similar event types). Let $\{E_i\}_{i=1}^N$ denote a set of event type vectors associated with a set of N event types. K-means clustering is an iterative process of partitioning the event type vectors into K clusters such that each event type vector belongs to a cluster with the closest cluster center. K-means clustering begins with the full N event type vectors and K cluster centers denoted by $\{A_r\}_{r=1}^K$, where $A_r$ is an n-dimensional cluster center. Each event type vector is assigned to one of the K clusters defined by:

$$C_k^{(m)} = \{E_i : |E_i - A_k^{(m)}| \leq |E_i - A_r^{(m)}| \forall j, 1 \leq r \leq K\} \quad (2a)$$

where
- $C_k^{(m)}$ is the k-th cluster k=1, 2, . . . , K; and
- superscript m is an iteration index m=1, 2, 3, . . . .

The cluster center $\vec{q}_k^{(m)}$ is the mean location of the event type vectors in the k-th cluster. A next cluster center is computed at each iteration as follows:

$$A_k^{(m+1)} = \frac{1}{|C_k^{(m)}|} \sum_{E_i \in C_k^{(m)}} E_i \quad (2b)$$

where $|C_k^{(m)}|$ is the number of data points in the k-th cluster.

For each iteration m, Equation (2a) is used to determine which cluster $C_k^{(m)}$ each event type vector belongs to followed by recomputing the coordinate location of each cluster center according to Equation (2b). The computational operations represented by Equations (2a) and (2b) are repeated for each iteration, m, until the event type vector in each of the K clusters do not change. The resulting clusters of event types are represented by:

$$C_k = \{E_p\}_{p=1}^{N_k} \quad (2c)$$

where
- $N_k$ is the number of event type vectors in the cluster $C_k$; and
- p is a time-stamp index of principal-component points in the cluster $C_k$.

The total number of event type vectors in the clusters is N, where $N = \sum_{j=1}^K N_j$. Each cluster of semantically event types has corresponding log messages that share a similar event type template and are semantically similar. FIG. 25B shows a representation of four example clusters of event types 2504-2507 with event types represented by three-dimensional event type vectors. Solid dots represent coordinates of event-type vectors in a 3-dimensional vector space. Each dot corresponds to an event type. For example, dot 2508 represents the coordinates of an event-type vector $E_i$ that corresponds to an event type $e_i$.

Returning to FIG. 20, the K clusters of event types and log messages obtained in the time interval are sent to the determine representative log messages module 2010. A similarity graph of the log messages associated with each cluster of semantically similar event types is constructed where each node of the similarity graph corresponds to the coordinates of a log message vector that represents a log message associated with the cluster of semantically similar event types. Edges of the similarity graph correspond to similarity scores that are computed as follows:

$$sim(L^x, L^y) = \frac{\sum_{n=1}^{N_e} l_n^x l_n^y}{\sqrt{\sum_{n=1}^{N_e} (l_n^x)^2 \sum_{n=1}^{N_e} (l_n^y)^2}} \quad (3)$$

The parameters $L^x$ and $L^y$ are log message vectors that correspond to log messages associated with any two event types of the clusters of event types and are denoted by $$L^x = \begin{bmatrix} l_1^x \\ \vdots \\ l_{N_e}^x \end{bmatrix} \text{ and } L^y = \begin{bmatrix} l_1^y \\ \vdots \\ l_{N_e}^y \end{bmatrix}$$

Figure 26A:
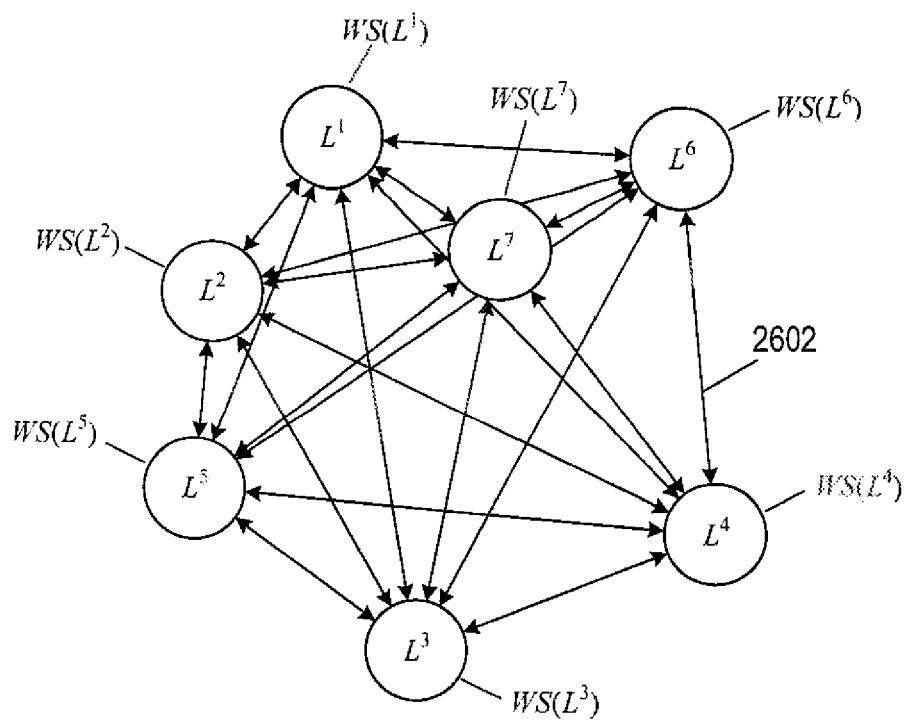
FIG. 26A shows an example of a similarity graph for log messages associated with event types of a cluster of event types.

FIG. 26A shows an example of a similarity graph constructed for log messages associated with event types in the cluster of event types 2505 shown in FIG. 25B. Large open circles labeled $L^1$-$L^7$ represent the coordinates of log message vectors that serve as nodes in the similarity graph. Each log message vector corresponds to a log message associated with an event type represented by an event type vector in the cluster of event types 2505. Edges of the similarity graph are represented by directional arrows, such as directional arrow 2602, that connect pairs of nodes. Each edge has a corresponding similarity score calculated according to Equation (3).

A text rank is computed for each node (i.e., text rank for each log message associated with the cluster of event types) of the similarity graph as follows:

$$WS(L^x) = (1-d) + d \sum_{L^y \in In(L^x)} \frac{sim(L^x, L^y)}{S} WS(L^y) \quad (4)$$

$$S = \sum_{L^y \in In(L^y)} sim(L^y, L^y)$$

d is a selected damping factor (i.e., $0 \leq d \leq 1$);
$In(L^x)$ is the set of nodes with edges that connect to $L^x$; and
$In(L^y)$ is the set of nodes with edges that connect to $L^y$.
Equation (4) forms a system of linear equations. Each linear equation corresponds to a node in the similarity graph. The text rank $WS(L^x)$ is numerically computed for each node of the similarity graph based on the system of linear equations with the number of unknown text ranks $WS(L^x)$ equal to the number of known $sim(L^x, L^y)/S$. The numerical computation may begin with arbitrary values assigned to the text ranks. An error rate of a node $L_x$ is approximated with a difference between text ranks computed at two successive iterations: $WS^{q+1}(L^x)-WS^q(L^x)$, where q is an iteration index. The system of linear equations converges when the error rate for any node in the similarity graph is less than a given threshold $WS^{q+1}(L^x)-WS^q(L^x)<Th$, where Th is a threshold). One or more log messages with the highest text ranks for a given cluster of event types represent the cluster and are regarded as representative log message. Text ranks are computed for the log messages associated with each cluster of event types. The representative log message are sent to the data center 2002 as shown in FIG. 20. For example, in one implementation, only the highest ranked log message (i.e., K log messages) of each of the K clusters are sent to the data center 2002. In another implementation, two or more of the highest ranked log messages of the K clusters are sent to the data center 2002. For example, let k=nK representative the total number of representative log messages sent to data center, where n is a user-selected positive integer that represents the number of highest ranked log messages sent for each cluster. The n highest ranked representative log messages of each of the K clusters are in turn clusters of representative log messages that are sent over the Internet to the data center and stored in data storage devices at the data center. The remaining log messages are discarded from data storage devices at the edge systems.

In FIG. 26A, text ranks $WS(L^1)$, . . . , $WS(L^7)$ are displayed next to the corresponding nodes $L^1$-$L^7$. Suppose the text ranks are ordered as follows: $WS(L^5) > WS(L^1) > WS(L^4) > WS(L^2) > WS(L^6) > WS(L^3) > WS(L^7)$. Because the node $L^5$ has the largest associated text rank $WS(L^5)$, the relevant log message for the cluster of event types 3702 is the log message with the log message vector or node $L^5$. In other implementations, two or more representative log message may be selected to represent a cluster of event types. For example, the three log messages that corresponds to the three highest text rank nodes $L^5$, $L^1$, and $L^4$ may be used to represent the cluster of event types 2505.

Figure 26B:
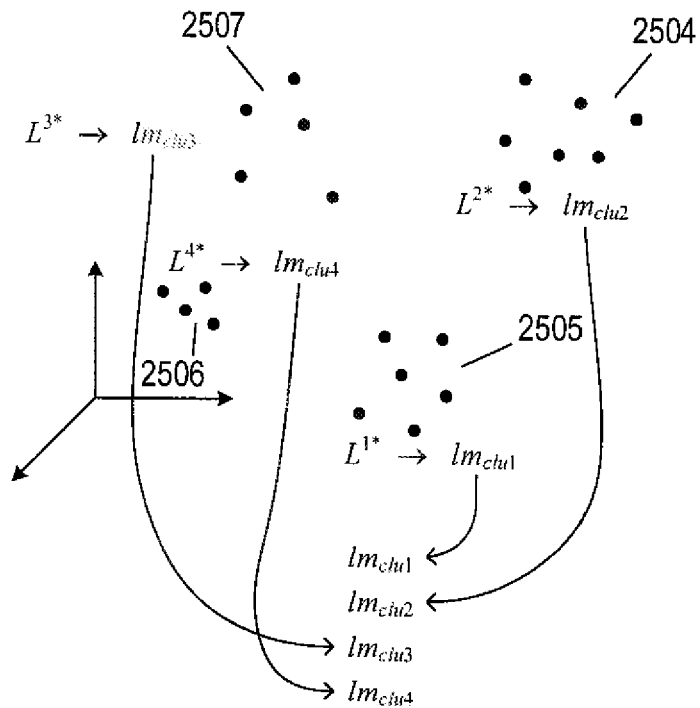
FIG. 26B shows an example of representative log message for the clusters of event types shown in FIG. 25B.

FIG. 26B shows an example of representative log message for the clusters of event types 2504-2507 in FIG. 25B. The clusters of event-types 2504-2507 have corresponding highest text rank nodes (i.e., log message vectors) $L^{1*}$, $L^{2*}$, $L^{3*}$, and $L^{4*}$ of similarity graphs associated with each of clusters 2504-2507. The asterisk is used to represent the node of each cluster with the largest text rank. The highest text rank nodes $L^{1*}$, $L^{2*}$, $L^{3*}$ and $L^{4*}$ have corresponding to log messages $lm_{clu1}$, $lm_{clu2}$, $lm_{clu3}$, and $lm_{clu4}$ that are in turn representative log message of the corresponding clusters 2504-2507. For example, cluster 2505 has a highest text rank node $L^{1*}$ obtained from solving a linear system of equations constructed from the similarity graph of the cluster of event types 2505 shown in FIG. 26A. In other words, $L^{1*} = \max\{L^1, L^2, L^3, L^4, L^5, L^6, L^7\}$ of the similarity graph shown in FIG. 26A is the highest text rank node and the corresponding log message $lm_{clu1}$ is a representative log message for the cluster 2505. The representative log message $lm_{clu1}$, $lm_{clu2}$, $lm_{clu3}$, and $lm_{clu4}$ of the four clusters of even types 2504-2507 are sent to and stored in the data center 2002 as shown in FIG. 20.

The methods described below with reference to FIGS. 27-32 are stored in one or more data storage devices as machine-readable instructions that when executed by one or more processors of the computer system shown in FIG. 1 reduce the volume of log messages sent from edge systems to a data center.

Figure 27:
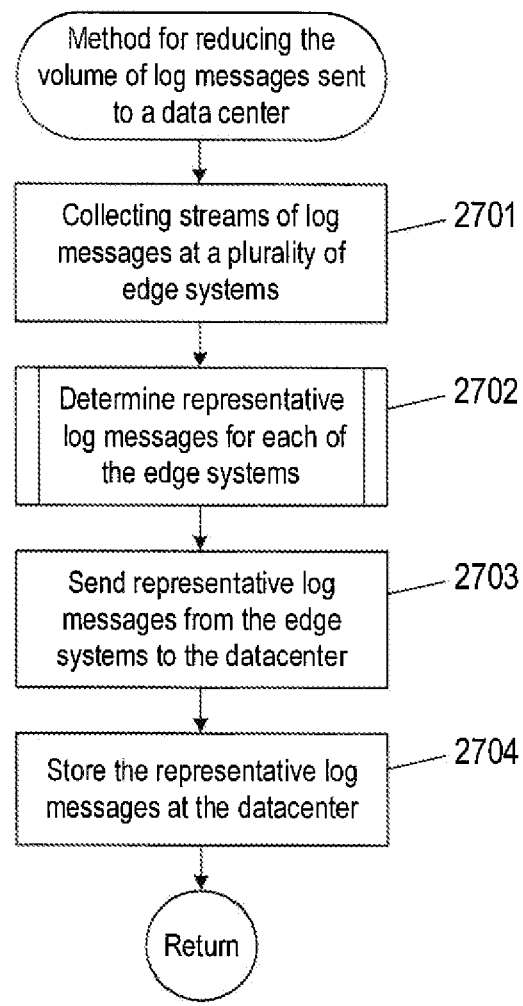
FIG. 27 shows a flow diagram illustrating an example implementation of a "method for reducing the volume of log messages sent to a data center."

FIG. 27 shows a flow diagram illustrating an example implementation of a "method for reducing the volume of log messages sent to a data center." In block 2701, a stream of log messages generated by one or more event sources of the data center are received and stored in a buffer. In block 2702, an "determine representative log messages for each of the edge systems" procedure is performed. An example implementation of the "determine representative log messages for each of the edge systems" procedure in performed in FIG. 39. In block 2703, representative log messages output in block 2702 are sent to the data center. In block 2704, the representative log messages are stored in data storage devices of the data center.

The data center may return remedial measures to correct a performance problem detected in the representative log messages. The remedial measures are executed at the one or more edge systems to correct the problem at the one or more edge systems. For example, when the problem is associated with changes to a sub-routine or a patch applied to software executed at the edge system, the remedial measures executed at the edge system back the changes and patch out and restore the sub-routine and application to previous versions prior to applying the changes or the patch.

Figure 28:
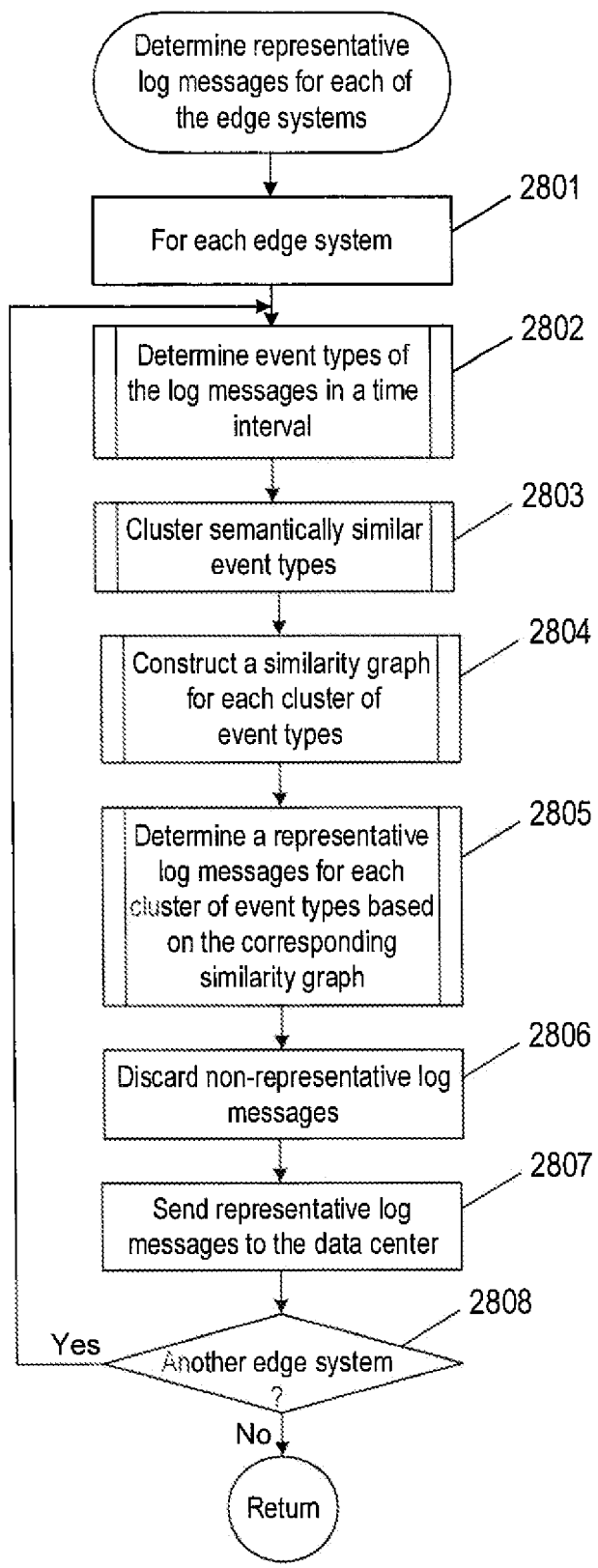
FIG. 28 shows a flow diagram illustrating an example implementation of the "determine representative log messages for each of the edge systems" performed in FIG. 27.

FIG. 28 shows a flow diagram illustrating an example implementation of the "determine representative log messages for each of the edge systems" performed in block 2701 of FIG. 27. A loop beginning with block 2801 repeats the operations represented by blocks 2802-2807 for each edge system. In block 2802, a "determine event types of log messages in a time interval" procedure is performed. An example implementation of the "determine event types of log messages in a time interval" procedure is performed as described with reference to FIG. 29. In block 2803, a "cluster semantically similar even types" procedure is performed. An example implementation of the "cluster semantically similar even types" procedure is performed as described with reference to FIG. 30. In block 2804, a "construct a similarity graph for each cluster of event types" procedure is performed. An example implementation of the "construct a similarity graph for each cluster of event types" procedure is performed as described with reference to FIG. 31. In block 2805, a "determine representative log messages for each cluster of event types based on the corresponding similarity graph" procedure is performed. An example implementation of the "determine representative log messages for each cluster of event types based on the corresponding similarity graph" procedure is performed as described with reference to FIG. 32. In block 2806, the edge system sends the representative log messages obtained in block 2805 over the Internet to the data center, where the representative log messages are stored in one or more data storage devices of the data center. In block 2807, non-representative log messages of the edge system are discarded. In decision block 2808, blocks 2802-2807 are repeated for another edge system.

Figure 29:
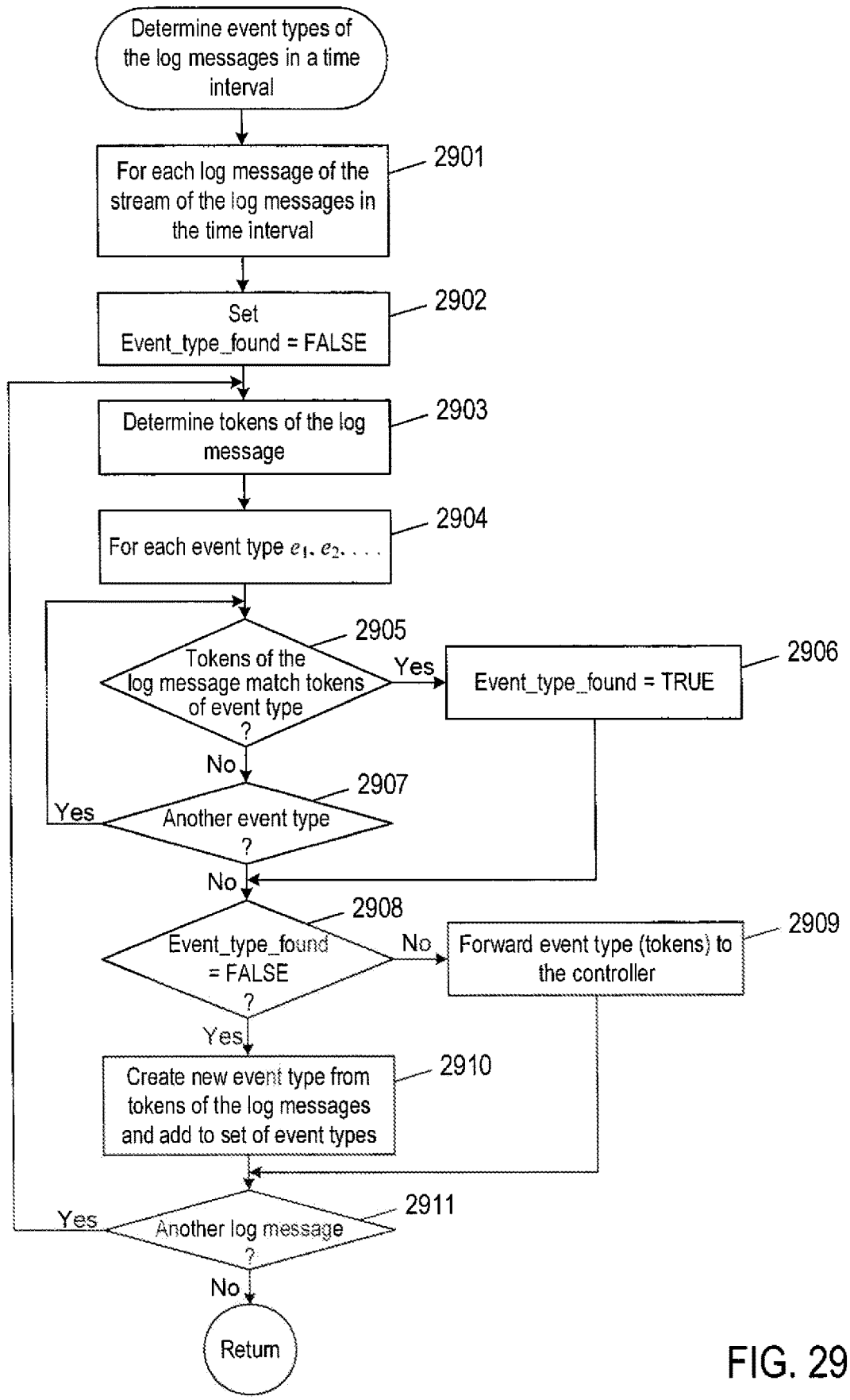
FIG. 29 shows a flow diagram illustrating an example implementation of the "determine event types of log messages in a time interval" performed in FIG. 28.

FIG. 29 shows a flow diagram illustrating an example implementation of the "determine event types of log messages in a time interval" performed in block 2802 of FIG. 28. A for loop beginning in block 2901 repeats the computational operations represented by blocks 2902-2910 for each log message in the stream of log messages. In block 2902, a logical variable "event_type_found" is set to logical value FALSE. In block 2903, tokens of the log message are determined as described above with reference to FIG. 21. A for loop beginning in block 2904 repeats the operations of blocks 2905 and 2906 for each even type. In decision block 2905 when the tokens of the log message match tokens of an event type, control flows to block 2906. In block 2906, the logical variable "event_type_found" is set to TRUE. In decision block 2907, blocks 2905 and 2906 are repeated for another event type. In decision block 2908, if the logical variable "event_type_found" is set to FALSE, control flows to block 2910 and a new event type is created from the tokens of the log message and added to a set of event types. In block 2909, event type tokens are forwarded to the controller. In decision block 2911, blocks 2902-2910 are repeated for another log message.

Figure 30:
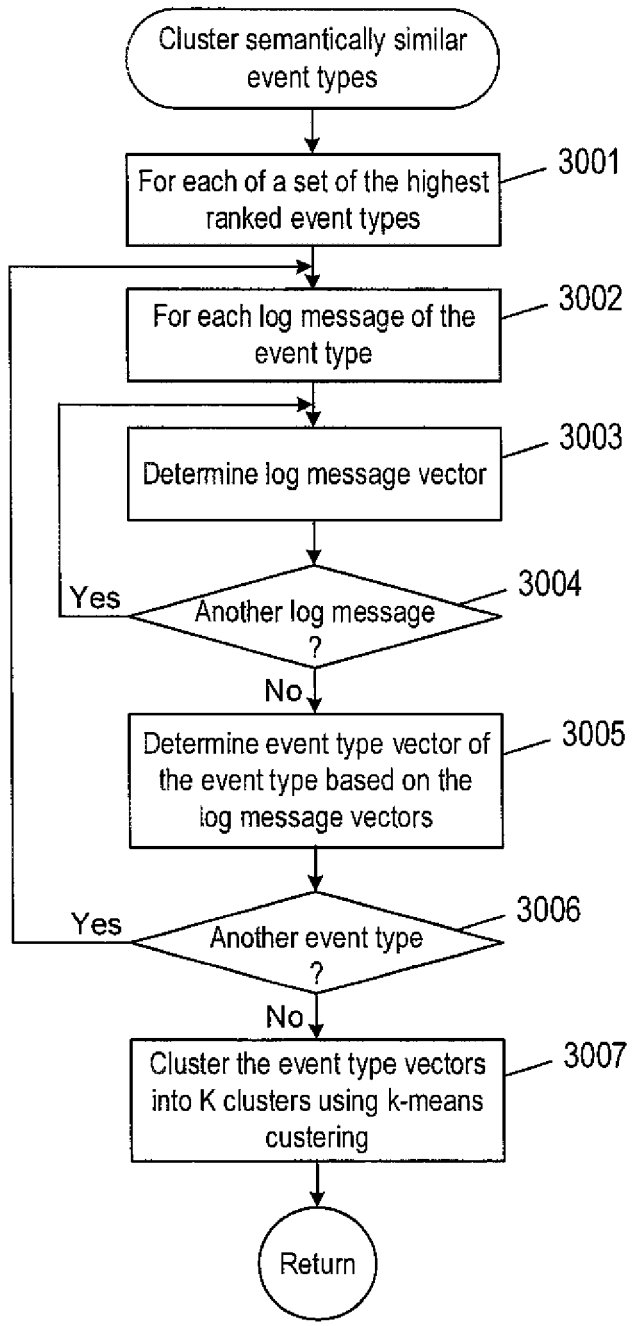
FIG. 30 shows a flow diagram illustrating an example implementation of the "cluster semantically similar even types" performed in FIG. 28.

FIG. 30 shows a flow diagram illustrating an example implementation of the "cluster semantically similar even types" performed in block 2803 of FIG. 28. A loop beginning with block 3001 repeats the operations represented by blocks 3002-3006. A loop beginning with block 3002 repeats the operation represented by block 3003 for each log message of the cluster of event type messages. In block 3003, a log message vector is computed for the log message Equations (1a)-(1b). In decision block 3004, the operation of block 3003 is computed until a log message vector has been computed for the log messages of the cluster of even types. In block 3005, an even type vector is computed for each even type based on the log message vectors as described above with reference to Equation (1e) and FIG. 23. In decision block 3006, the operations of block 3002-3005 are repeated each of the even types. In block 4407, clusters of event type vectors are determined using K-means clustering as described above with reference to Equations (2a)-(2b) and FIG. 25B.

Figure 31:
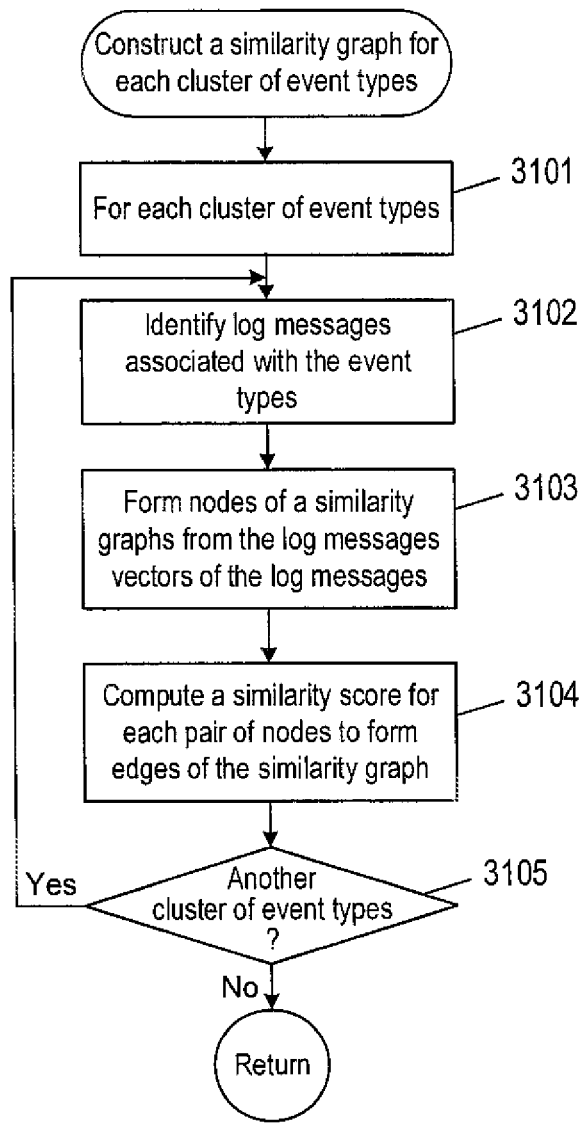
FIG. 31 shows a flow diagram illustrating an example implementation of the "construct a similarity graph for each cluster of event types" performed in FIG. 28.

FIG. 31 shows a flow diagram illustrating an example implementation of the "construct a similarity graph for each cluster of event types" performed in block 2804 of FIG. 28. A loop beginning with block 3101 repeats the operations represented by blocks 3102-3104 for each cluster of even types determined in block 2803 of FIG. 30. In block 3102, log messages associated with a cluster of event types are identified. In block 3103, nodes of a similarity graph are formed from the log message vectors of the log messages using the log message vectors obtained in block 3003 of FIG. 30. In block 3104, a similarity score is computed for each pair of nodes to form edges of the similarity graph. In decision block 3105, blocks 3102-3104 are repeated for another cluster of event types.

Figure 32:
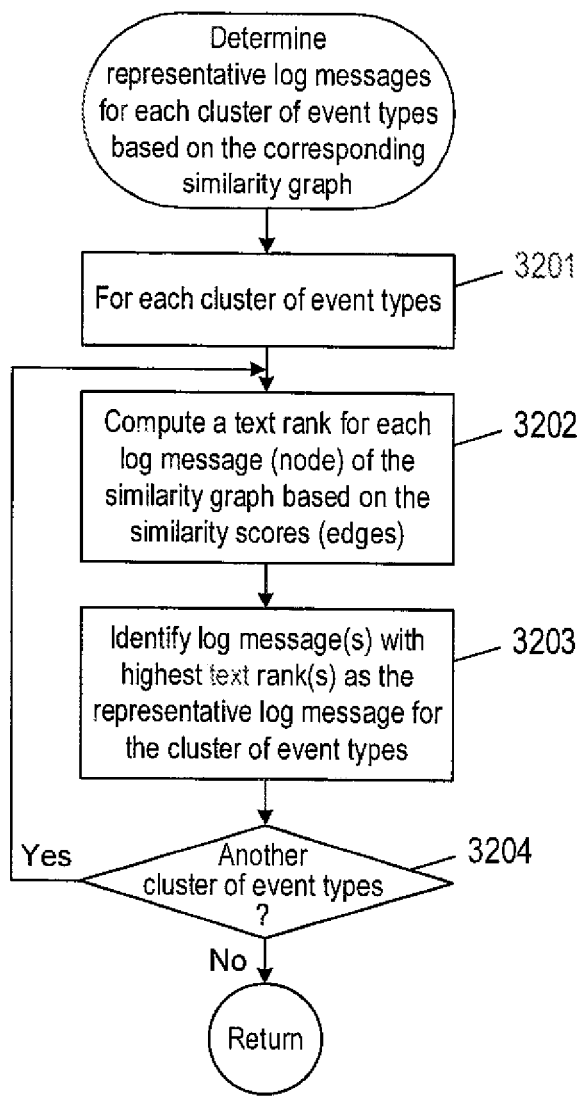
FIG. 32 shows a flow diagram illustrating an example implementation of the "determine representative log messages for each cluster of event types based on the corresponding similarity graph" performed in FIG. 28.

FIG. 32 shows a flow diagram illustrating an example implementation of the "determine representative log messages for each cluster of event types based on the corresponding similarity graph" performed in block 2805 of FIG. 28. A loop beginning with block 3201 repeats the operations represented by blocks 3202-3203 for each cluster of event types obtained in block 2803 of FIG. 28. In block 3202, a text rank is computed for each log message vector (node) of the similarity graph based on the similarity scores (edges) of the similarity graph as described above with reference to Equation (4) and FIG. 26A. In block 3203, one or more log messages with the highest text rank are identified as the representative log message for the cluster of event types as described above with reference to FIG. 26B. The one or more representative log messages of a cluster are referred to as cluster of representative log message. In decision block 3204, the operations represented by blocks 3202-3203 are repeated for another cluster of even types.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method stored in one or more data storage devices and executed using one or more processors of an edge system for reducing volumes of log messages sent from the edge system to a data center, the method comprising:
    collecting a stream of log messages generated by one or more event sources of the edge system;
    determining representative log messages of the log messages in the stream of log messages at the edge system;
    sending the representative log messages from the edge system to the data center;
    discarding non-representative log messages from data storage devices of the edge system; and
    storing the representative log messages in data storage devices at the data center, thereby reducing the volumes of log messages sent from the edge system to the data center, wherein determining the representative log messages includes determining event types of the log messages in the stream of log messages, clustering semantically similar event types, and determining one or more representative log messages for each cluster of even types.

2. The method of claim 1 wherein determining representative log messages of the log messages in the stream of log messages comprises:
    constructing a similarity graph for each cluster of event types;
    sending the one or more representative log messages for each cluster to the data center; and discarding non-representative log messages from data storage devices of the edge system.

3. The method of claim 2 wherein semantically similar event types comprises:
computing a log message vector for each the log message in the search window;
computing an even type vector for each of even type in the subset of highest ranked event types in the search window based on the log message vectors; and
applying K-means clustering to the event type vectors to obtain the clusters of event types.

4. The method of claim 2 wherein constructing a similarity graph for each cluster of event types comprises
for each cluster of event types
determining log messages associated with the cluster of even types,
forming nodes of a similarity graph form from the log message vectors of the log messages, and
computing a similarity score for each pair of nodes to form edges of the similarity graph.

5. The method of claim 2 wherein determining one or more representative log messages for each cluster of even types comprises:
for each cluster of event types
computing a text rank for each node of the similarity graph based on the similarity scores of edges connected to each node,
identifying a log message with a largest text rank, and
identifying one or more log messages with the largest text ranks as the one or more representative log messages for the cluster of event types.

6. The method of claim 1 wherein the representative log messages comprise clusters of representative log messages.

7. A computer system for reducing volumes of log messages sent from an edge system to a data center, the system comprising:
one or more processors;
one or more data storage devices; and
machine-readable instructions stored in the one or more data storage devices of the computer system that when executed using the one or more processors controls the computer system to perform operations comprising:
collecting a stream of log messages generated by one or more event sources of the edge system;
determining representative log messages of the log messages in the stream of log messages at the edge system;
sending the representative log messages to the data center over the Internet; and
discarding non-representative log messages from data storage devices of the edge system, wherein determining the representative log messages includes determining event types of the log messages in the stream of log messages, clustering semantically similar event types, and determining one or more representative log messages for each cluster of even types.

8. The system of claim 7 wherein determining representative log messages of the log messages in the stream of log messages comprises:
constructing a similarity graph for each cluster of event types;
sending the one or more representative log messages for each cluster to the data center; and
discarding non-representative log messages from data storage devices of the edge system.

9. The system of claim 8 wherein semantically similar event types comprises:
computing a log message vector for each the log message in the search window;
computing an even type vector for each of even type in the subset of highest ranked event types in the search window based on the log message vectors; and
applying K-means clustering to the event type vectors to obtain the clusters of event types.

10. The system of claim 8 wherein constructing a similarity graph for each cluster of event types comprises
for each cluster of event types
determining log messages associated with the cluster of even types,
forming nodes of a similarity graph form from the log message vectors of the log messages, and
computing a similarity score for each pair of nodes to form edges of the similarity graph.

11. The system of claim 8 wherein determining one or more representative log messages for each cluster of even types comprises:
for each cluster of event types
computing a text rank for each node of the similarity graph based on the similarity scores of edges connected to each node,
identifying a log message with a largest text rank, and
identifying one or more log messages with the largest text ranks as the one or more representative log messages for the cluster of event types.

12. The medium of claim 7 further comprises:
receiving remedial measures for correcting a performance problem at the edge system from the data center; and
executing the remedial measures to correct the performance problems.

13. A non-transitory computer-readable medium encoded with machine-readable instructions for enabling one or more processors of a computer system to reduce log messages sent to a data center by performing operations comprising:
collecting a stream of log messages generated by one or more event sources of an edge system;
determining representative log messages of the log messages in the stream of log messages using a computer system of the edge system;
sending the representative log messages from the edge system to the data center; and
discarding non-representative log messages from data storage devices of the edge system, where the representative log messages received at the data center are stored in data storage devices, wherein determining the representative log messages includes determining event types of the log messages in the stream of log messages, clustering semantically similar event types, and determining one or more representative log messages for each cluster of even types.

14. The medium of claim 13 wherein determining representative log messages of the log messages in the stream of log messages comprises:
constructing a similarity graph for each cluster of event types;
sending the one or more representative log messages for each cluster to the data center; and
discarding non-representative log messages from data storage devices of the edge system.

15. The method of claim 2 wherein semantically similar event types comprises:
computing a log message vector for each the log message in the search window;

computing an even type vector for each of even type in the subset of highest ranked event types in the search window based on the log message vectors; and applying K-means clustering to the event type vectors to obtain the clusters of event types.

16. The medium of claim 14 wherein constructing a similarity graph for each cluster of event types comprises for each cluster of event types determining log messages associated with the cluster of even types, forming nodes of a similarity graph form from the log message vectors of the log messages, and computing a similarity score for each pair of nodes to form edges of the similarity graph.

17. The medium of claim 14 wherein determining one or more representative log messages for each cluster of even types comprises:

for each cluster of event types computing a text rank for each node of the similarity graph based on the similarity scores of edges connected to each node, identifying a log message with a largest text rank, and identifying one or more log messages with the largest text ranks as the one or more representative log messages for the cluster of event types.

18. The medium of claim 13 wherein the representative log messages comprise clusters of representative log messages.

19. The medium of claim 13 further comprises:

receiving remedial measures for correcting a performance problem at the edge system from the data center; and executing the remedial measures to correct the performance problems.

\* \* \* \* \*